(12) United States Patent
Tsushio et al.

(10) Patent No.: US 8,063,951 B2
(45) Date of Patent: Nov. 22, 2011

(54) INFORMATION PROCESSING APPARATUS AND METHOD, AND PROGRAM

(75) Inventors: Kenji Tsushio, Chiba (JP); Yasufumi Suzuki, Tokyo (JP); Chihiro Motono, Tokyo (JP); Tetsuya Uemura, Kanagawa (JP); Simon Currie, Tokyo (JP); Hiroyuki Takahashi, Kanagawa (JP)

(73) Assignee: Sony Corporation (JP)

( * ) Notice: Subject to any disclaimer, the term of this patent is extended or adjusted under 35 U.S.C. 154(b) by 594 days.

(21) Appl. No.: 11/512,628

(22) Filed: Aug. 30, 2006

(65) Prior Publication Data

US 2007/0139534 A1 Jun. 21, 2007

(30) Foreign Application Priority Data

Aug. 31, 2005 (JP) ................. P2005-250555

(51) Int. Cl.
*H04N 5/26* (2006.01)
*H04N 5/228* (2006.01)
*H04N 7/00* (2006.01)
*G06F 13/00* (2006.01)

(52) U.S. Cl. .............. 348/231.2; 348/222.1; 348/552; 711/163

(58) Field of Classification Search .......... 348/231.2, 348/231.3, 231.5, 222.1, 231.99–231.9, 552; 711/154, 163
See application file for complete search history.

(56) References Cited

U.S. PATENT DOCUMENTS

| | | | |
|---|---|---|---|
| 5,806,072 A * | 9/1998 | Kuba et al. ............ | 707/200 |
| 6,249,313 B1 * | 6/2001 | Nishi ............ | 348/231.9 |
| 2003/0007640 A1 * | 1/2003 | Harada et al. ............ | 380/270 |
| 2004/0028228 A1 * | 2/2004 | Hamada et al. ............ | 380/201 |
| 2004/0075738 A1 * | 4/2004 | Burke et al. ............ | 348/143 |
| 2004/0075746 A1 | 4/2004 | Takamine et al. | |
| 2004/0157638 A1 * | 8/2004 | Moran et al. ............ | 455/550.1 |
| 2005/0068453 A1 * | 3/2005 | Sasakura ............ | 348/335 |
| 2005/0104967 A1 * | 5/2005 | Kawada ............ | 348/207.99 |
| 2005/0110878 A1 * | 5/2005 | Dalton ............ | 348/231.2 |

(Continued)

FOREIGN PATENT DOCUMENTS

JP 02214271 A 8/1990

(Continued)

OTHER PUBLICATIONS

Office Action from Japanese Application No. 2005-250555, dated Mar. 4, 2010.

(Continued)

*Primary Examiner* — Sinh Tran
*Assistant Examiner* — Mark Monk
(74) *Attorney, Agent, or Firm* — Lerner, David, Littenberg, Krumholz & Mentlik, LLP

(57) ABSTRACT

An information processing apparatus has a plurality of recording media, and includes an imaging unit operable to capture an image of a subject, and a recording unit operable to record image data of the captured image onto the recording media such that the amounts of recorded image data differ between the recording media. The same image data is recorded onto at least a first recording medium built in the apparatus and a second recording medium removable from the apparatus such that the amount of data recorded on the first medium is smaller than that recorded on the second medium. In this information processing apparatus, a user can view images captured previously with more ease because image data recorded on the first recording medium is sorted by date and is provided to the user in this state.

11 Claims, 17 Drawing Sheets

U.S. PATENT DOCUMENTS

| | | | |
|---|---|---|---|
| 2005/0141875 A1* | 6/2005 | Fukushima | 386/94 |
| 2005/0174449 A1* | 8/2005 | Matsuzaka | 348/240.3 |
| 2005/0210183 A1* | 9/2005 | Yokota et al. | 711/100 |

FOREIGN PATENT DOCUMENTS

| | | | |
|---|---|---|---|
| JP | 11-215457 A | 8/1999 | |
| JP | 2001-160947 A | 6/2001 | |
| JP | 2003111012 A | 4/2003 | |
| JP | 2003274341 A | 9/2003 | |
| JP | 2005110290 A | 4/2005 | |
| JP | 2005-160090 A | 6/2005 | |

OTHER PUBLICATIONS

Office Action from Japanese Application No. 2005-250555, dated May 25, 2010.

European Search Report issed on Aug. 4, 2010 in connection with corresponding European Appln. No. 06 25 4475.

* cited by examiner

INFORMATION PROCESSING APPARATUS AND METHOD, AND PROGRAM

CROSS-REFERENCE TO RELATED APPLICATIONS

The present application claims priority from Japanese Patent Application No. JP 2005-250555 filed on Aug. 31, 2005, the disclosure of which is hereby incorporated by reference herein.

BACKGROUND OF THE INVENTION

1. Field of the Invention

The present invention relates to information processing apparatuses and methods and programs, and in particular, relates to an information processing apparatus and method for recording data onto at least two recording media and playing the data in different ways, and a program therefor.

2. Description of the Related Art

Widespread image processing apparatuses, such as digital still cameras and digital video cameras, each use an imager, e.g., a charge coupled device (CCD) or a complementary metal oxide semiconductor (CMOS), to capture a still image or a moving image.

In such an image processing apparatus, image data of a still or moving image captured is recorded onto a recording medium. In the following description, when it is unnecessary to distinguish between a still image and a moving image, they will simply be referred to as images.

In some cases, in recording image data of a captured still image onto a recording medium, a still image whose size is smaller than that of the captured still image is generated and the generated still image with the smaller size is also recorded. The smaller-size still image is called a thumbnail image. On the other hand, in recording image data of a captured moving image onto a recording medium, a moving image whose size is smaller than that of the captured moving image may be generated and the generated moving image with the smaller size may also be recorded. Each of the above-described smaller-size still and moving images is used as a reference image to retrieve the original still or moving image. Japanese Unexamined Patent Application Publication No. 2001-160947 discloses the above-described apparatus and method.

The image processing apparatuses include another type of apparatus having a function of displaying (playing) an image based on image data recorded in a recording medium. The apparatuses include further another type of image processing apparatus having a function of outputting recorded image data to an external device connected thereto.

As described above, in the image processing apparatus, such as a digital still camera or a digital video camera, generally, images are recorded onto a recording medium removable from the apparatus or a built-in recording medium, such as a magnetic medium, an optical medium, or a non-volatile memory. Generally, a user demands to keep recorded images as clear as possible. Since there are few recording media having enough capacity to fill the demand, the user has to transfer a stored data file from a recording medium to another device, e.g., a personal computer, having a recording area of much larger capacity, or another recording medium after recording. As described above, it is necessary to secure a free capacity of the recording medium in the information processing apparatus.

The above-described operation can be performed when the user has an external device, such as a personal computer, capable of receiving data or a large-capacity recording medium near at hand. If the user does not have the external device or the large-capacity recording medium near at hand, the user has to delete image data stored in the recording medium in the image processing apparatus, or edit the data to secure a free capacity. Alternatively, the user has to abandon image-capture (shooting). Unfortunately, the use misses a shooting opportunity. This leads to degradation in usability.

In deleting or editing image data recorded in the image processing apparatus, the user has to repeat steps of selecting image data and determining deletion of the selected image data. This may cause a wrong operation. In many cases, it is difficult to restore deleted or edited image data. The user may lose an opportunity for viewing the original image.

According to another approach, the recording medium may be changed to another new one. In this case, an image stored in the changed recording medium cannot be viewed through the image processing apparatus. Alternatively, to view the image through the apparatus, the user has to perform some operations, e.g., select a file in the recording medium and copy data of the file to the new recording medium. The user cannot view the image in the changed recording medium unless the user performs the above-described operations.

It is, therefore, difficult to view a predetermined number of data files in the image processing apparatus. The user views the files using a device, e.g., a personal computer, having a large-capacity medium for backup.

According to another approach to solving the above-described problems, Japanese Unexamined Patent Application Publication No. 2005-160090 discloses a system with a built-in flash memory for backup of favorite images. In this system, it is necessary to select a file to be backed up during playback. Disadvantageously, the operation for selection and determination include many steps. It is, therefore, difficult for users to operate this system.

The present invention is made in consideration of the above-described circumstances and it is desirable to view images captured previously with more ease.

SUMMARY OF THE INVENTION

According to an embodiment of the present invention, there is provided an information processing apparatus having a plurality of recording media. The apparatus includes an imaging unit operable to capture an image of a subject; and a recording unit operable to record image data of the captured image onto the recording media such that the amounts of recorded image data differ between the recording media.

According to this embodiment, the plurality of recording media may include at least a first recording medium built in the information processing apparatus and a second recording medium removable from the information processing apparatus. The recording unit may record the image data such that the amount of image data recorded on the first recording medium is smaller than the amount of image data recorded on the second recording medium.

When the remaining available capacity of the first recording medium is insufficient to record new image data, the image data recorded on the first recording medium may be deleted in capturing order.

The plurality of recording media may include at least a first recording medium built in the information processing apparatus and a second recording medium removable from the information processing apparatus. The recording unit may record the image data such that the compression ratio of the image data recorded on the first recording medium is higher than the compression ratio of the image data recorded on the second recording medium.

Preferably, the plurality of recording media include at least a first recording medium built in the information processing apparatus and a second recording medium removable from the information processing apparatus. The recording unit may further record a management file for management of the image data onto the first recording medium.

The image data may be sorted by date and managed in the management file.

The information processing apparatus may further include a playback unit that plays the image data recorded on the plurality of recording media; and a selection unit that selects any one of the recording media. The playback unit may play the image data recorded on the selected recording medium.

The plurality of recording media may include at least a first recording medium built in the information processing apparatus and a second recording medium removable from the information processing apparatus. The recording unit may further record a management file for management of the image data onto the first recording medium. The playback unit may play the image data recorded on the first recording medium based on the management file and may play the image data recorded on the second recording medium in capturing order.

According to another embodiment of the present invention, there is provided a method for processing information in an information processing apparatus having a plurality of recording media. The method includes capturing an image of a subject; and recording image data of the captured image onto the recording media such that the amounts of recorded image data differ between the recording media.

According to another embodiment of the present invention, there is provided a program for allowing a computer to execute a process by an information processing apparatus having a plurality of recording media. The process includes capturing an image of a subject; and recording image data of the captured image onto the recording media such that the amounts of recorded image data differ between the recording media.

According to the embodiment of the present invention, a captured image of a subject may be recorded onto different recording media at different compression ratios.

According to the embodiment of the present invention, previously captured images can be easily viewed.

According to the embodiment of the present invention, the same captured image can be recorded onto different recording media such that the amounts of data differ between the recording media.

DETAILED DESCRIPTION

Before describing an embodiment of the present invention, the correspondence between the features of aspects of the present invention and the specific elements disclosed in an embodiment of the present invention is discussed below. This description is intended to assure that an embodiment supporting the present invention is described in this specification. Thus, even if an element in the following embodiment is not described as relating to a certain feature of the present invention, that does not necessarily mean that the element does not relate to that feature of the aspects. Conversely, even if an element is described herein as relating to a certain feature of the aspects, that does not necessarily mean that the element does not relate to other features of the aspects.

According to the embodiment of the present invention, the information processing apparatus (e.g., an image processing apparatus 11 in FIG. 2) has a plurality of recording media and includes the imaging unit (e.g., an imaging control unit 141 in FIG. 3) for capturing an image of a subject and the recording unit (e.g., a recording control unit 142 in FIG. 3) for recording image data of the image captured by the imaging unit onto the recording media such that the amounts of recorded image data differ between the recording media.

An embodiment of the present invention will now be described with reference to the drawings.

Structure of Image Processing Apparatus

Figure 1:
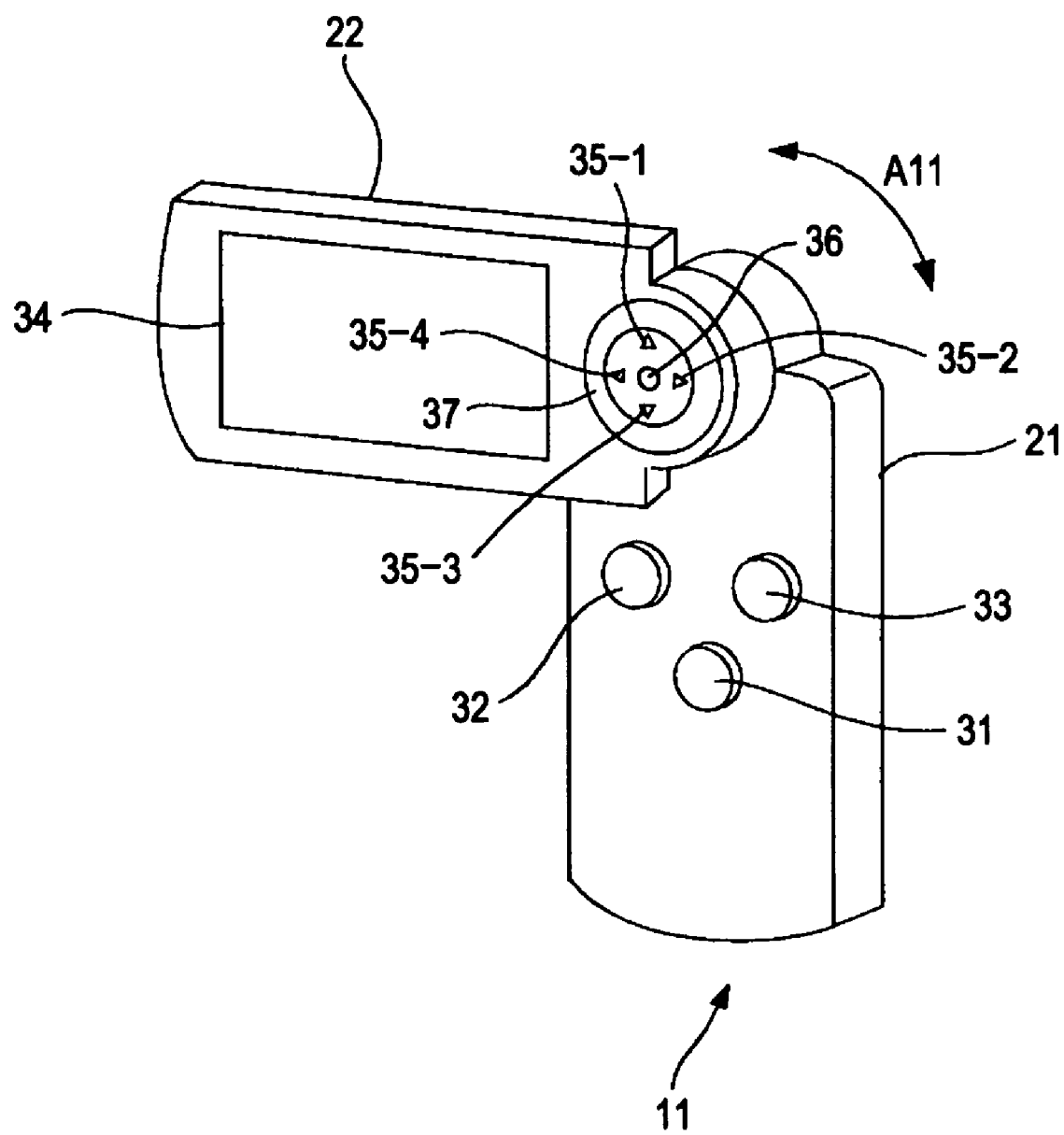
FIG. 1 is a perspective view of an image processing apparatus according to an embodiment of the present invention.

FIG. 1 shows an example of the structure of an image processing apparatus to which the present invention is applied. The image processing apparatus can be applied to, e.g., digital still cameras and digital video cameras for capturing a still image and/or a moving image.

An image processing apparatus 11 includes body segments 21 and 22. A user operates any button arranged on the body segment 21 or 22 while holding the body segment 21, so that the user can allow the image processing apparatus 11 to image a subject, i.e., capture a still image or a moving image of the subject, or play the captured image.

In the following description, when it is unnecessary to distinguish between a still image and a moving image, "sill image" and "moving image" will simply be called "image". Accordingly, in the following description, "capturing an image" includes not only "capturing a moving image" but also "capturing a still image".

The body segment 21 includes a mode selection button 31, a shutter button 32, and a recording button 33. The user operates the mode selection button 31 to select (switching) between a recording mode for image capture and a playback mode for image playback (display). The user operates the shutter button 32 to capture a still image. The user uses the recording button 33 to capture a moving image.

The other body segment 22 includes a display unit 34 for displaying a menu screen for image and various settings. The body segment 22 further includes arrow keys 35-1 to 35-4 and an enter button 36 in an area on the right side of the display unit 34 in FIG. 1. The user operates the arrow keys 35-1 to 35-4 to move a cursor displayed in the display unit 34 in order to select an image or a menu item. When the user decides to display the selected image or to execute the selected menu item, the user presses the enter button 36. In addition, the body segment 22 includes a shuttle 37, which is an annular operation unit.

The shuttle 37 is rotatable about the enter button 36 in the direction shown by the arrow A11 in FIG. 1. The user operates the shuttle 37 to move the cursor in accordance with the amount of rotation. In the following description, when it is unnecessary to distinguish between the arrow keys 35-1 to 35-4, they will simply be referred to as the arrow keys 35.

The body segment 22 is pivotally connected to the body segment 21 such that the body segment 22 is pivotable about the enter button 36 in the direction shown by the arrow A11 in FIG. 1. For example, the user can pivot the body segment 22 while holding the body segment 21 to adjust the posture of the display unit 34. When the body segment 22 is further pivoted at one end of the body segment 21, the body segment 22 can be superposed on the body segment 21. For instance, the user pivots the body segment 22 to superpose the body segment 22 on the other body segment 21, thus making the image processing apparatus 11 compact enough for easy carrying.

In the body segment 21, on another surface opposite to that having the mode selection button 31, the shutter button 32, and the recording button 33, a lens (not shown) for shooting is arranged in a position opposed to the enter button 36. For example, the user holds the body segment 21, points the lens at a subject, determines the angle of view while viewing an image displayed in the display unit 34, and operates the shutter button 32 or the recording button 33, thus shooting the subject.

Figure 2:
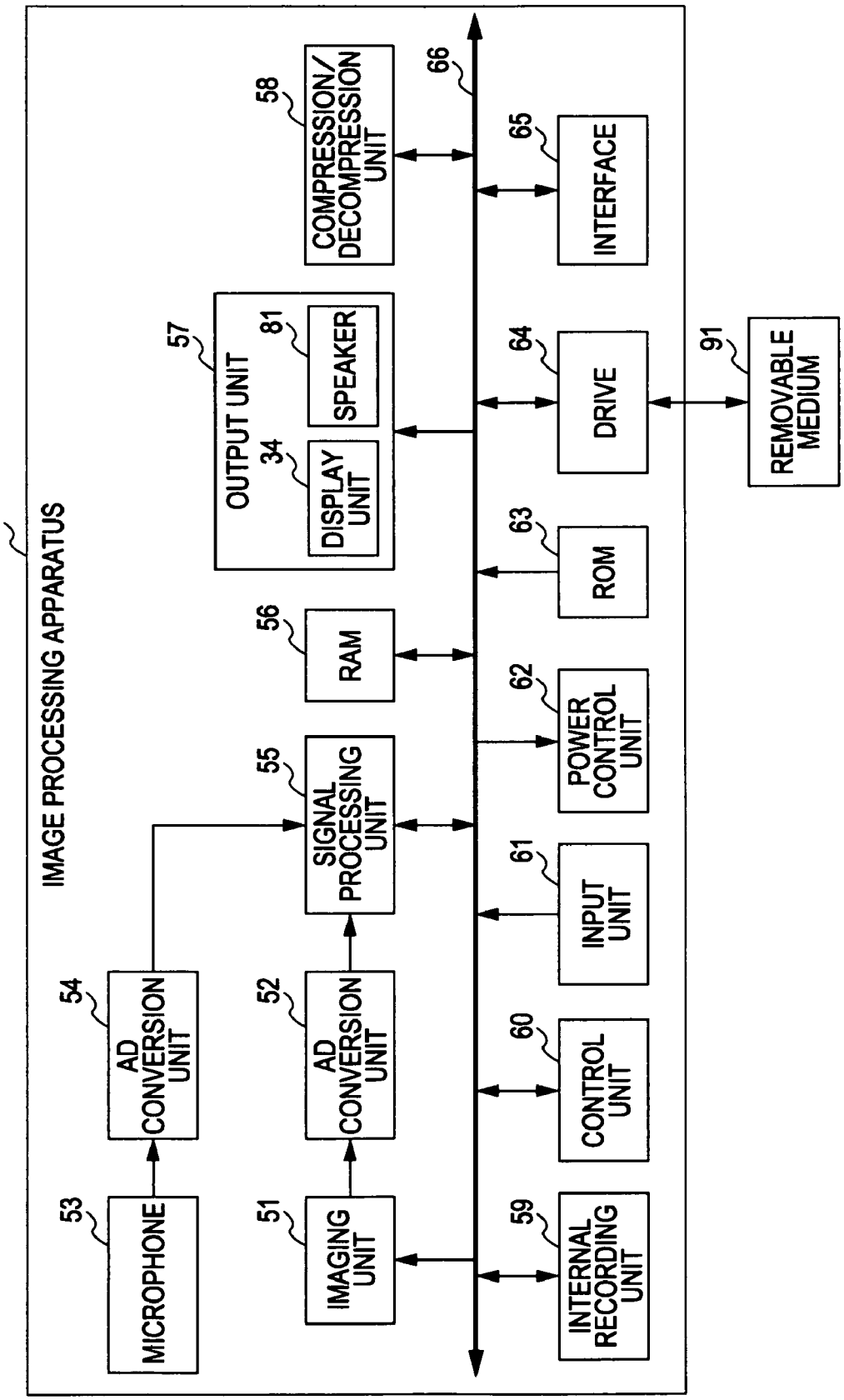
FIG. 2 is a block diagram of the internal structure of the image processing apparatus according to the embodiment.

FIG. 2 is a block diagram of the internal structure of the image processing apparatus 11 in FIG. 1.

The image processing apparatus 11 includes an imaging unit 51, an analog-digital (AD) conversion unit 52, a microphone 53, an AD conversion unit 54, a signal processing unit 55, a random access memory (RAM) 56, an output unit 57, a compression/decompression unit 58, an internal recording unit 59, a control unit 60, an input unit 61, a power control unit 62, a read only memory (ROM) 63, a drive 64, and an interface 65.

The imaging unit 51, the signal processing unit 55, the RAM 56, the output unit 57, the compression/decompression unit 58, the internal recording unit 59, the control unit 60, the input unit 61, the power control unit 62, the ROM 63, the drive 64, and the interface 65 are connected to each other via a bus 66.

The imaging unit 51 includes an imager, such as a CCD or a CMOS, and a lens. Under the control of the control unit 60, the imaging unit 51 captures an image of a subject and supplies an analog image signal of the captured image to the AD conversion unit 52. For example, the imager, constituting the imaging unit 51, receives light passing through the lens (not shown), stores charge corresponding to the amount of received light to generate a voltage signal, and supplies the generated signal as an image signal to the AD conversion unit 52.

The AD conversion unit 52 converts the analog image signal supplied form the imaging unit 51 into a digital signal and supplies the resultant signal to the signal processing unit 55.

The microphone 53 collects sounds surrounding the image processing apparatus 11, converts the collected sounds into an audio signal that is an electric signal, and supplies the signal to the AD conversion unit 54. The AD conversion unit 54 converts the audio signal, which is analog, supplied from the microphone 53 into a digital signal and supplies the resultant signal to the signal processing unit 55.

Under the control of the control unit 60, if necessary, the signal processing unit 55 performs a predetermined process on the image signal supplied from the AD conversion unit 52 or the audio signal supplied from the AD conversion unit 54 to generate image data or audio data and supplies the data to the RAM 56. For example, under the control of the control unit 60, the signal processing unit 55 converts the image signal supplied from the AD conversion unit 52 into a luminance signal (Y signal) and color difference signals (a Cr signal and a Cb signal), performs gamma correction on the signals to generate image data, and supplies the data to the RAM 56.

Under the control of the control unit 60, the RAM 56 temporarily stores the image data or audio data supplied from the signal processing unit 55 and then supplies the stored data to the output unit 57 or the compression/decompression unit 58. In addition, the RAM 56 appropriately stores a program executed by the control unit 60 and data.

The output unit 57 includes the display unit 34 and a speaker 81. The display unit 34 of the output unit 57 includes, e.g., a liquid crystal display and displays an image based on the image data supplied from the signal processing unit 55 through the RAM 56, or the image data supplied from the compression/decompression unit 58. The speaker 81 of the output unit 57 outputs sounds based on the audio data supplied from the compression/decompression unit 58.

During the recording operation, under the control of the control unit 60, the compression/decompression unit 58 compresses the image data supplied from the RAM 56 in a predetermined standard, thus generating compressed image data. During the playback operation, under the control of the control unit 60, the compression/decompression unit 58 obtains image data from the internal recording unit 59 or a removable medium 91, decompresses the obtained image data as needed, and supplies the resultant data to the output unit 57.

The internal recording unit 59 includes a hard disk and a non-volatile flash memory built in the image processing apparatus 11. Under the control of the control unit 60, the internal recording unit 59 records image data supplied from the compression/decompression unit 58. In addition, the internal recording unit 59 supplies a recorded still-image file or moving-image file to the compression/decompression unit 58.

The control unit 60 includes, e.g., a central processing unit (CPU). The control unit 60 executes a program stored in the ROM 63 to control the entire image processing apparatus 11. In addition, the control unit 60 performs various processes in accordance with input signals supplied from the input unit 61. For instance, the control unit 60 controls the imaging unit 51 in accordance with an input signal from the input unit 61, thus controlling focusing, lens aperture, and shutter speed.

The input unit 61 includes, e.g., the mode selection button 31, the shutter button 32, the recording button 33, the arrow keys 35, the enter button 36, and the shuttle 37 in FIG. 1. The input unit 61 supplies an input signal corresponding to the user's operation to the control unit 60.

In response to a power supply instruction from the control unit 60, the power control unit 62 supplies power to the respective components of the image processing apparatus 11 from a battery (not shown) or an external power supply connected to the image processing apparatus 11. For example, when the user turns on the image processing apparatus 11, the input unit 61 supplies an input signal indicating the power-on to the control unit 60 in response to the user operation. In accordance with the input signal from the input unit 61, the control unit 60 instructs the power control unit 62 to supply power. The power control unit 62 supplies power to the respective components of the image processing apparatus 11 in accordance with the instruction from the control unit 60.

The ROM 63 stores various programs and data and supplies the stored programs or data to the control unit 60. As necessary, the removable medium 91 is attached (connected) to the drive 64. After completion of the attachment, the drive 64 reads data recorded on the removable medium 91 as needed and supplies the read data to the control unit 60 or the compression/decompression unit 58. Alternatively, the drive 64 records data, supplied from the control unit 60 or the compression/decompression unit 58, onto the removable medium 91.

The removable medium 91 includes, e.g., a non-volatile flash memory, a magnetic disc, an optical disc, or a magneto-optical disc. The medium is removable from the image processing apparatus 11. The removable medium 91 records image data (an image file) supplied from the image processing apparatus 11. In addition, the removable medium 91 supplies various data, e.g., a recorded image file to the image processing apparatus 11.

The interface 65 is connected to, e.g., a universal serial bus (USB) cable for connection to an external device to transfer data between the external device and the image processing apparatus 11. The interface 65 is also connected to a predetermined cable (called, e.g., an AV cable) for a television receiver to transfer image data recorded on the internal recording unit 59 and the removable medium 91 to the television receiver.

Figure 3:
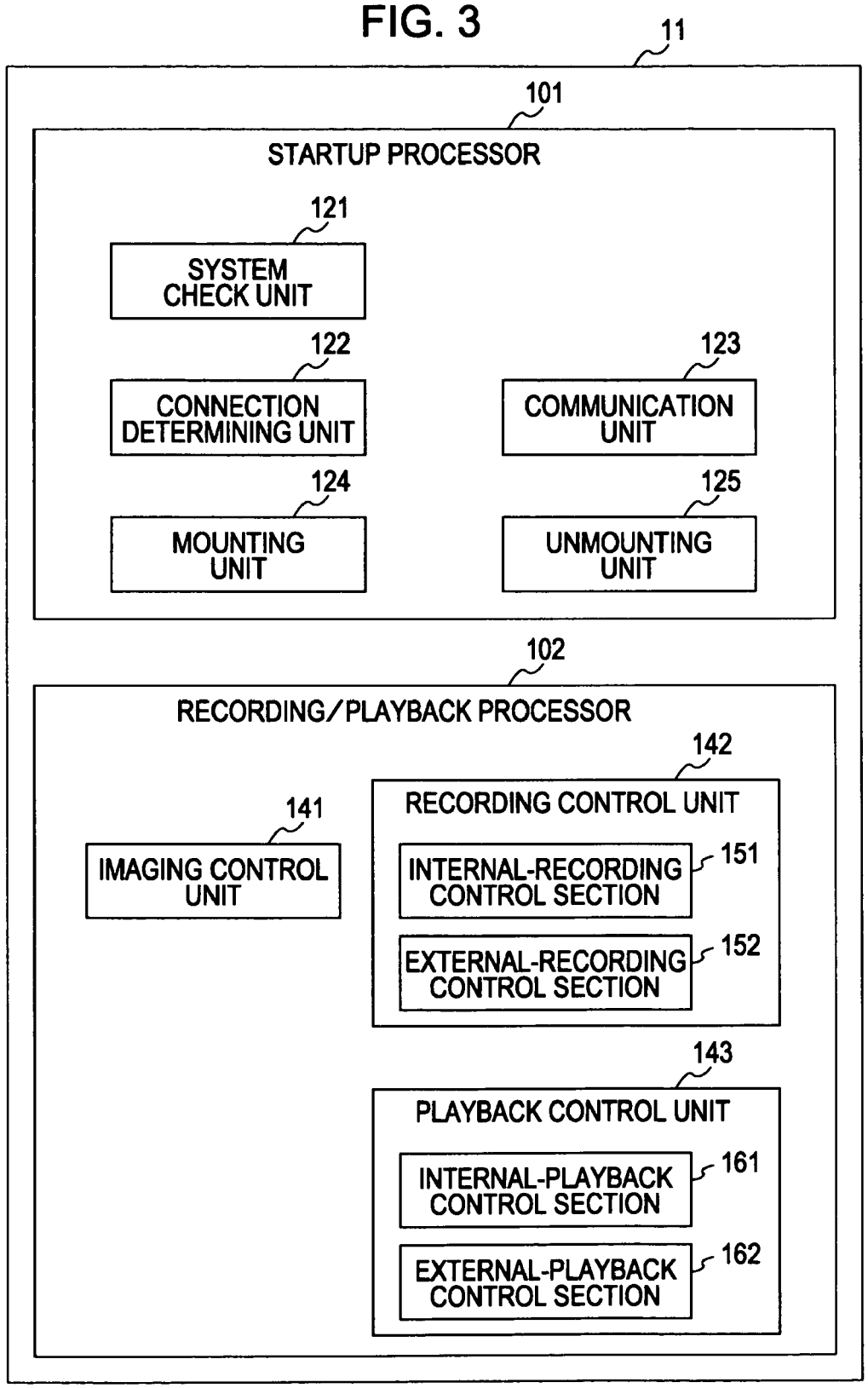
FIG. 3 is a block diagram of the functional structure of the image processing apparatus according to the embodiment.

FIG. 3 is a diagram of the functional structure of the image processing apparatus 11. The image processing apparatus 11 includes a startup processor 101 and a recording/playback processor 102. The startup processor 101 performs predetermined processing during startup. The recording/playback processor 102 performs processing related to recording or playback after startup.

The startup processor 101 includes a system check unit 121, a connection determining unit 122, a communication unit 123, a mounting unit 124, and an unmounting unit 125. The recording/playback processor 102 includes an imaging control unit 141, a recording control unit 142, and a playback control unit 143. The recording control unit 142 includes an internal-recording control section 151 and an external-recording control section 152. The playback control unit 143 includes an internal-playback control section 161 and an external-playback control section 162.

The startup processor 101 performs processing to check the connection state of the image processing apparatus 11 with another device upon and after startup of the apparatus 11 (i.e., during turn on). In the startup processor 101, the system check unit 121 checks the respective components of the image processing apparatus 11 when the image processing apparatus 11 is turned on.

In the startup processor 101, the connection determining unit 122 determines whether the image processing apparatus 11 is connected to an external device through a cable. The communication unit 123 communicates with the connected external device to transmit and/or receive data to/from the device.

In the startup processor 101, the mounting unit 124 mounts an area in the internal recording unit 59 or the removable medium 91. The unmounting unit 125 unmounts an area in the internal recording unit 59. Area mounting/unmounting will be described below with reference to FIG. 4. As will be explained below, a target to be unmounted is the internal recording unit 59. The removable medium 91 is not targeted.

The recording/playback processor 102 captures a still image and/or a moving image and records the captured image onto the internal recording unit 59 and the removable medium 91. In addition, the recording/playback processor 102 reads image data of a still image or a moving image recorded on the internal recording unit 59 or the removable medium 91 and plays the data.

In the recording/playback processor 102, the imaging control unit 141 controls the imaging unit 51 to image a subject, i.e., capture an image of the subject. In the recording control unit 142, the internal-recording control section 151 records image data of the image of the subject captured by the imaging control unit 141 onto the internal recording unit 59. The external-recording control section 152 records the image data of the captured image onto the removable medium 91.

In the playback control unit 143, the internal-playback control section 161 reads image data recorded on the internal recording unit 59 and plays the data. The external-playback control section 162 reads image data recorded on the removable medium 91 and plays the data.

According to the present embodiment of the present invention, image data of a captured image of a subject is simultaneously recorded onto the internal recording unit 59 and the removable medium 91. This simultaneous recording will be described in detail below. Image data recorded on the internal recording unit 59 is not supplied to a predetermined external device so that the data is not viewed and edited through the external device.

Figure 4:
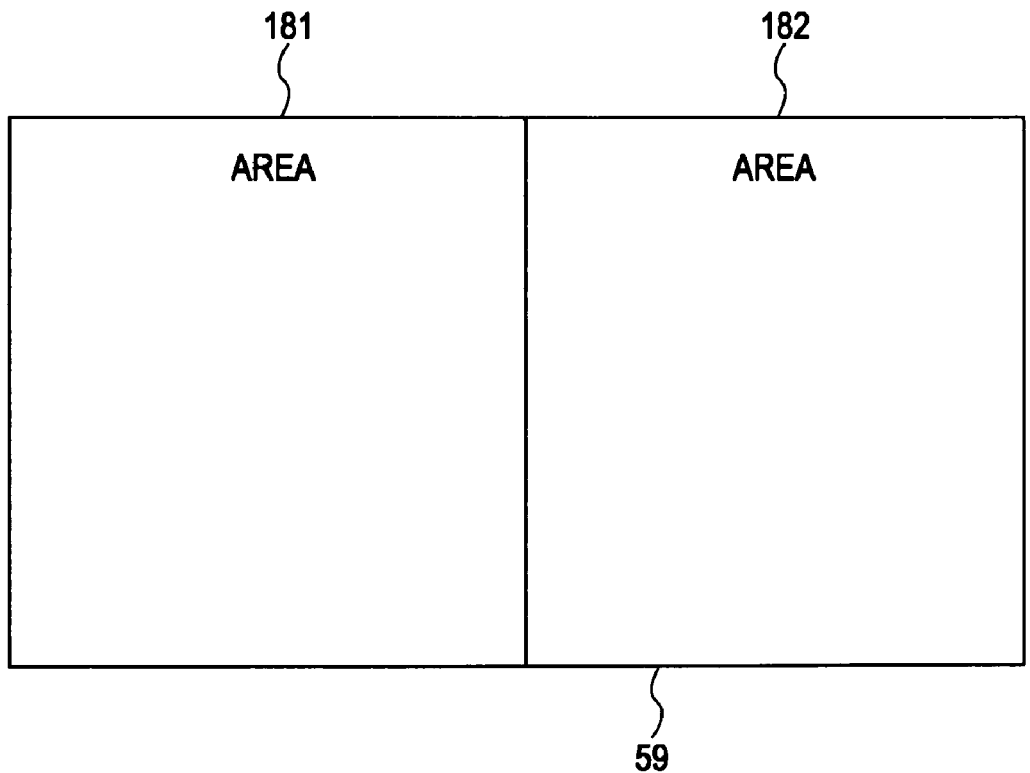
FIG. 4 is a diagram explaining areas provided in an internal recording unit in the image processing apparatus.

The internal recording unit 59 includes two kinds of areas. Data that is not supplied to the external device is recorded in one area. Data that can be supplied to the external device is recorded in the other area. Referring to FIG. 4, the internal recording unit 59 includes two areas 181 and 182.

In this instance, the area 181 is the area where data that is not supplied to the external device is recorded and the area 182 is the area where data that can be supplied to the external device is recorded. In other words, data recorded in the area 181 has to be protected so that the data is not viewed or edited through the external device and data recorded in the area 182 may be viewed and/or edited through the external device.

As described above, according to the present embodiment, the internal recording unit 59 includes the two areas.

Fundamentally, the same image is recorded into the area 181 and the removable medium 91. In other words, according to the present embodiment, an image obtained by one shooting is recorded into each of the area 181 in the internal recording unit 59 and the removable medium 91.

Images are recorded in the internal recording unit 59 so that a specific function called an image album is realized. In other words, images are recorded in the internal recording unit 59 such that the user can confirm subject images captured through the image processing apparatus 11.

Images recorded on the removable medium 91 may be appropriately supplied to other devices, such as a personal computer and a printer. Since the images are data that can be supplied to the other devices, the data may be edited.

The images recorded on the internal recording unit 59 are independent of those recorded on the removable medium 91. In other words, even when an image recorded on the removable medium 91 is deleted, a process of deleting the corresponding image recorded on the internal recording unit 59 is not performed.

In addition, images displayed when the images recorded on the internal recording unit 59 are viewed through the image processing apparatus 11 do not necessarily match those displayed when the images recorded on the removable medium 91 are viewed through the image processing apparatus 11. In other words, the images recorded on the internal recording unit 59 are not edited to secure the consistency of images between the removable medium 91 and the internal recording unit 59.

When the user intends to view, e.g., previously captured images, the user views images recorded on the internal recording unit 59. When the user intends to confirm image to be actually printed, the user views images recorded on the removable medium 91.

Since recorded images are properly used depending on the purposes, the user is prevented from editing images recorded on the internal recording unit 59. In order to prevent the user from editing images on the internal recording unit 59, the area 181 in the internal recording unit 59 is invisible through the external device connected to the image processing apparatus 11.

The operation of the image processing apparatus 11 will now be described below, the operation being performed to execute the above-described processing.

Operation of Image Processing Apparatus

Figure 5:
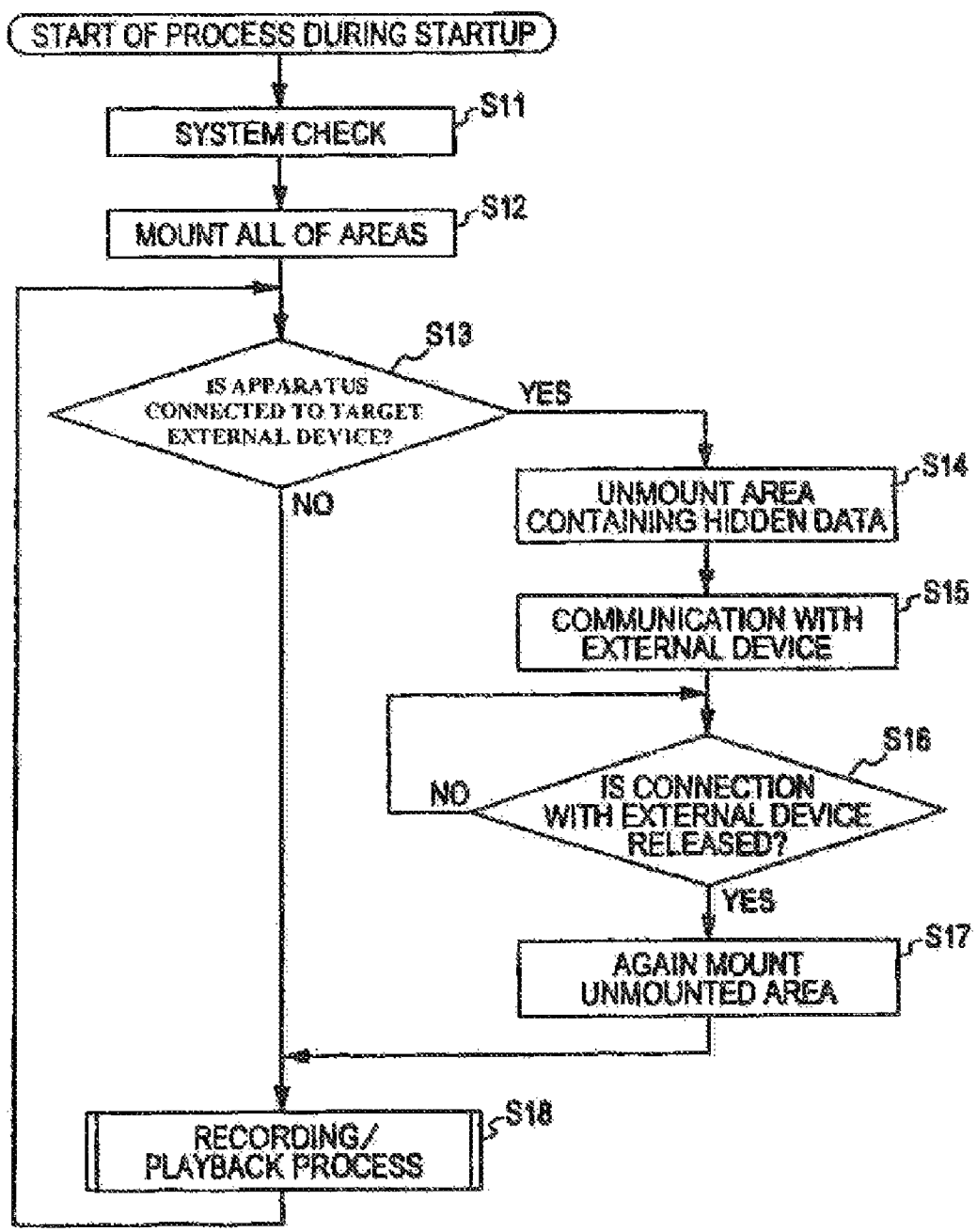
FIG. 5 is a flowchart of the operation of the image processing apparatus.

FIG. 5 is a flowchart explaining the operation of the image processing apparatus 11, the operation being performed during startup (or for a period of time after the image processing apparatus 11 is turned on until it is turned off). In step S11, the system check unit 121 (see FIG. 3) of the image processing apparatus 11 makes a system check.

When the user operates the input unit 61 of the image processing apparatus 11 (FIG. 2) to turn on the apparatus 11, the input unit 61 supplies an input signal indicating the turn-on to the control unit 60 in accordance with the user operation. In response to the input signal from the input unit 61, the control unit 60 instructs the power control unit 62 to supply power to the respective components of the image processing apparatus 11. Consequently, the power control unit 62 supplies power to the respective components, thus activating the image processing apparatus 11.

After power is supplied to the respective components of the image processing apparatus 11 as described above, the system check unit 121 makes the system check to determine whether the respective components of the image processing apparatus 11 operate normally. As for the system check in step S11, e.g., whether the internal recording unit 59 and the connected removable medium 91 are ready to write or read data is determined.

In step S12, all of areas in the internal recording unit 59 and the removable medium 91 are mounted. For instance, since the internal recording unit 59 includes the two areas 181 and 182 as shown in FIG. 4, the areas 181 and 182 are mounted. The term "mounting" means a process of checking on the number of files recorded in each area and also checking on the descriptions of each file, i.e., formatting recording media, e.g., the internal recording unit 59 and the removable medium 91.

The general concept of mounting will now be described. A file system has a virtual tree structure including a plurality of file system (disk partition) devices. Each device is accessible at the time when the device is mounted on the system. When the device is unmounted, it is inaccessible.

In step S12, the recording media are subjected to the mounting process, so that the user can view files recorded in each recording medium attached to or built in the image processing apparatus 11 through the apparatus 11 and can also view the files through another device connected to the image processing apparatus 11.

In step S13, the connection determining unit 122 determines whether the image processing apparatus 11 is connected to an external device. In this instance, another device connected to the image processing apparatus 11 via, e.g., USB is determined as an external device. The external device connected via USB is a device capable of accessing a file recorded on the internal recording unit 59 of the image processing apparatus 11 and editing the file.

In other words, in step S13, it is determined whether another device capable of editing (modifying) a file recorded in the area 181 of the internal recording unit 59 is connected to the image processing apparatus 11. When an external device, such as a television receiver, is connected to the image processing apparatus 11 via a cable called an AV cable, therefore, this external device is not determined as a target device in step S13 because the television receiver does not have a function of editing a file recorded on the internal recording unit 59.

When the interface 65 includes a USB, whether an external device is connected to the image processing apparatus 11 via USB (i.e., the presence or absence of an external device ready for communication with the communication unit 123 via USB) is determined in step S13.

If it is determined in step S13 that the present apparatus is connected to an external device, the operation proceeds to step S14. In step S14, the unmounting unit 125 (FIG. 3) unmounts an area containing hidden data. In this instance, "hidden data" is data that should not be edited, i.e., data (including a file) recorded in the area 181 of the internal recording unit 59. It is undesirable to edit hidden data.

In step S14, the area 181 is unmounted. The unmounting unit 125 unmounts the area 181 in step S14. Consequently, the area 181 is inaccessible. The external device connected to the image processing apparatus 11 via USB cannot access the unmounted area 181. Therefore, the connected external device cannot edit a file recorded in the area 181.

As described above, the area containing hidden data is unmounted so that the area is inaccessible. Advantageously, it is possible to prevent hidden data from being edited by the external device.

After the area containing hidden data is unmounted in step S14, the communication unit 123 (FIG. 3) starts communication with the external device in step S15. As described above, the external device cannot access the unmounted area (in this case, the area 181). In step S15, therefore, data recorded in the area 182 and data recorded on the removable medium 91 attached to the image processing apparatus 11 can be transferred between the communication unit 123 and the external device.

In step S16, whether the connection with the external device is released is determined. The connection determining unit 122 always checks the state of the image processing apparatus 11 to determine whether the apparatus is connected to the external device via USB. As described above, when the connection determining unit 122 determines the connection with the external device, the area containing hidden data is unmounted. When the unit 122 determines that the connection between the present apparatus and the external device is released, the unmounted area is again mounted.

In other words, when the connection determining unit 122 determines the release of the connection therebetween in step S16, the operation proceeds to step S17. Thus, the unmounted area (in this case, the area 181) is again mounted. When determining the release of the connection with the external device, the connection determining unit 122 instructs the mounting unit 124 to again mount the unmounted area.

As described above, while the image processing apparatus 11 is connected to the external device, i.e., the external device may edit data recorded in the apparatus, the area containing data (hidden data) which should not be edited is unmounted, thus concealing the area. While the image processing apparatus 11 is not connected to the external device, the area containing hidden data is mounted such that this area is viewable.

As described above, since the area containing hidden data is mounted or unmounted as necessary, the area is viewable unless the image processing apparatus 11 is connected to an external device having an editing function. In other words, while the image processing apparatus 11 operates solely, the area containing hidden data is viewable through the image processing apparatus 11. Even if the image processing apparatus 11 does not operate solely, the area is viewable as long as an external device having no editing function is connected to the apparatus.

When the unmounted area is again mounted in step S17, the operation proceeds to step S18. In step S18, a recording or playback process is executed. When it is determined in step S13 that any external device is not connected to the apparatus, the operation also proceeds to step S18.

As described above, the image processing apparatus 11 has functions for recording and playing images. While the image processing apparatus 11 is not connected to an external device, the apparatus captures an image of a subject and records image data of the captured image onto the internal recording unit 59 and the removable medium 91, or plays image data recorded on the internal recording unit 59 or the removable medium 91.

While the recording/playback process is executed in step S18, the connection determining unit 122 (FIG. 3) continues to check the connection state of the image processing apparatus 11, i.e., determine whether the apparatus is connected to an external device. In other words, simultaneously with the execution of the process in step S18, step S13 and subsequent steps are repeated.

Figure 6:
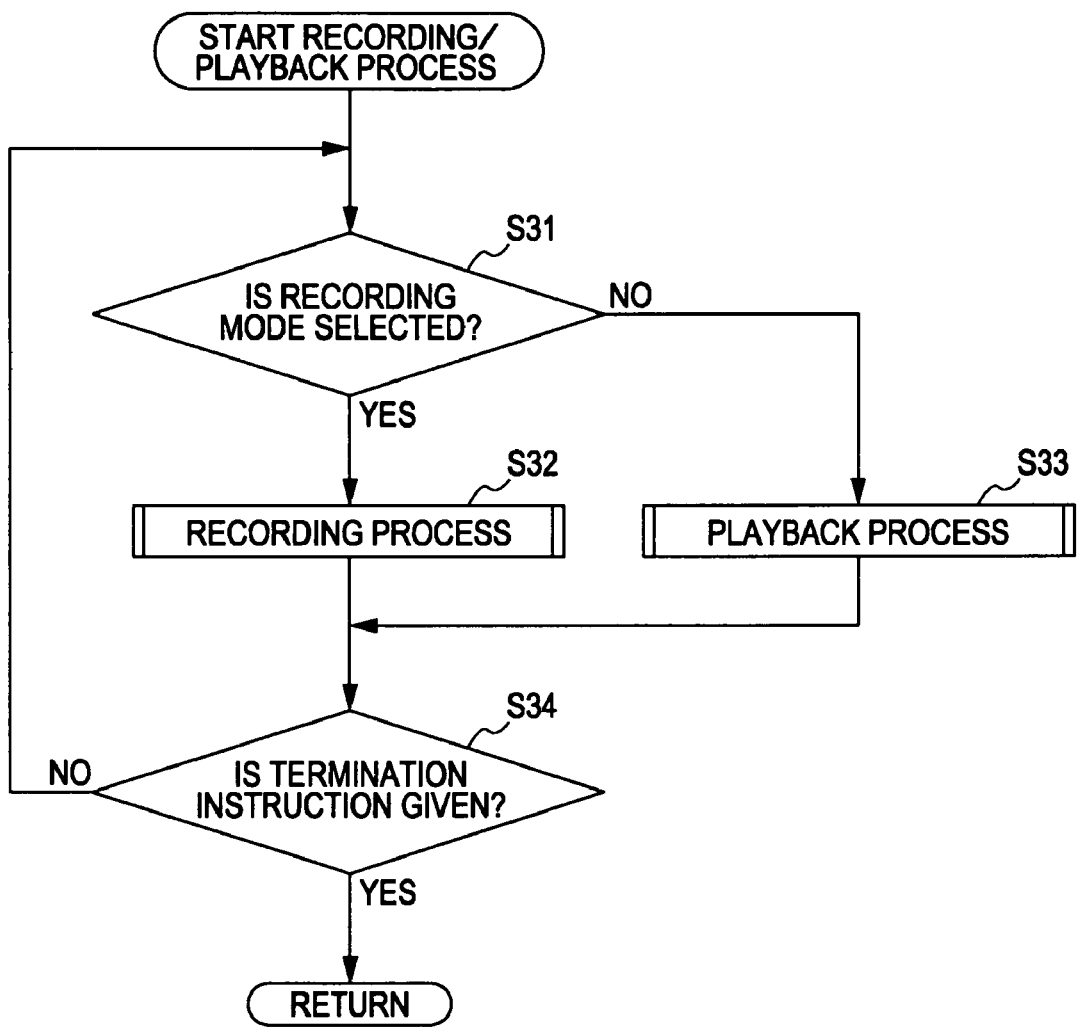
FIG. 6 is a flowchart of a recording/playback process of the image processing apparatus.

The recording/playback process in step S18 will be explained with reference to a flowchart of FIG. 6. In step S31, whether a recording mode is selected is determined. For example, when the user operates the mode selection button 31 (FIG. 1) to select the recording mode, the input unit 61 supplies a signal indicating that the recording mode is selected to the control unit 60. When receiving this signal from the input unit 61, the control unit 60 determines that the recording mode is selected.

When it is determined in step S31 that the recording mode is selected, the process proceeds to step S32, thus executing the recording process. The details of the recording process will be described below. The image processing apparatus 11 captures a still image or a moving image in accordance with the user operation during the recording process.

On the other hand, when it is determined in step S31 that the recording mode is not selected, i.e., a playback mode is selected, the process proceeds to step S33. The image processing apparatus 11 executes the playback process. The details of the playback process will be described below. The image processing apparatus 11 plays a still image or a moving image on the basis of an image file (image data) obtained by shooting during the playback process.

After the recording process is executed in step S32, alternatively, the playback process is executed in step S33, it is determined in step S34 whether an instruction to terminate the recording or playback process is given.

In step S34, when it is determined that the termination instruction is not given, various steps are continuously performed. Accordingly, the process is returned to step S31 and the above-described steps are repeated.

On the other hand, if it is determined in step S34 that the termination instruction is given, the process is returned to step S13 in FIG. 5. Step S13 and subsequent steps are repeated.

The process of the flowchart in FIG. 5, i.e., the process performed after turn-on is terminated, for example, when the user instructs to turn off the present apparatus. For instance, when the user operates the input unit 61 (FIG. 2) to turn off the apparatus, the input unit 61 supplies a signal indicating a turn-off instruction to the control unit 60. When receiving this signal from the input unit 61, the control unit 60 instructs the power control unit 62 to interrupt power supply. Then, the power control unit 62 interrupts power supply to the respective components of the image processing apparatus 11, thus turning off the image processing apparatus 11.

As described above, when the recording mode is selected, the image processing apparatus 11 captures an image and records the image in accordance with the user operation. When the playback mode is selected, the apparatus plays an image in accordance with the user operation.

Figure 7:
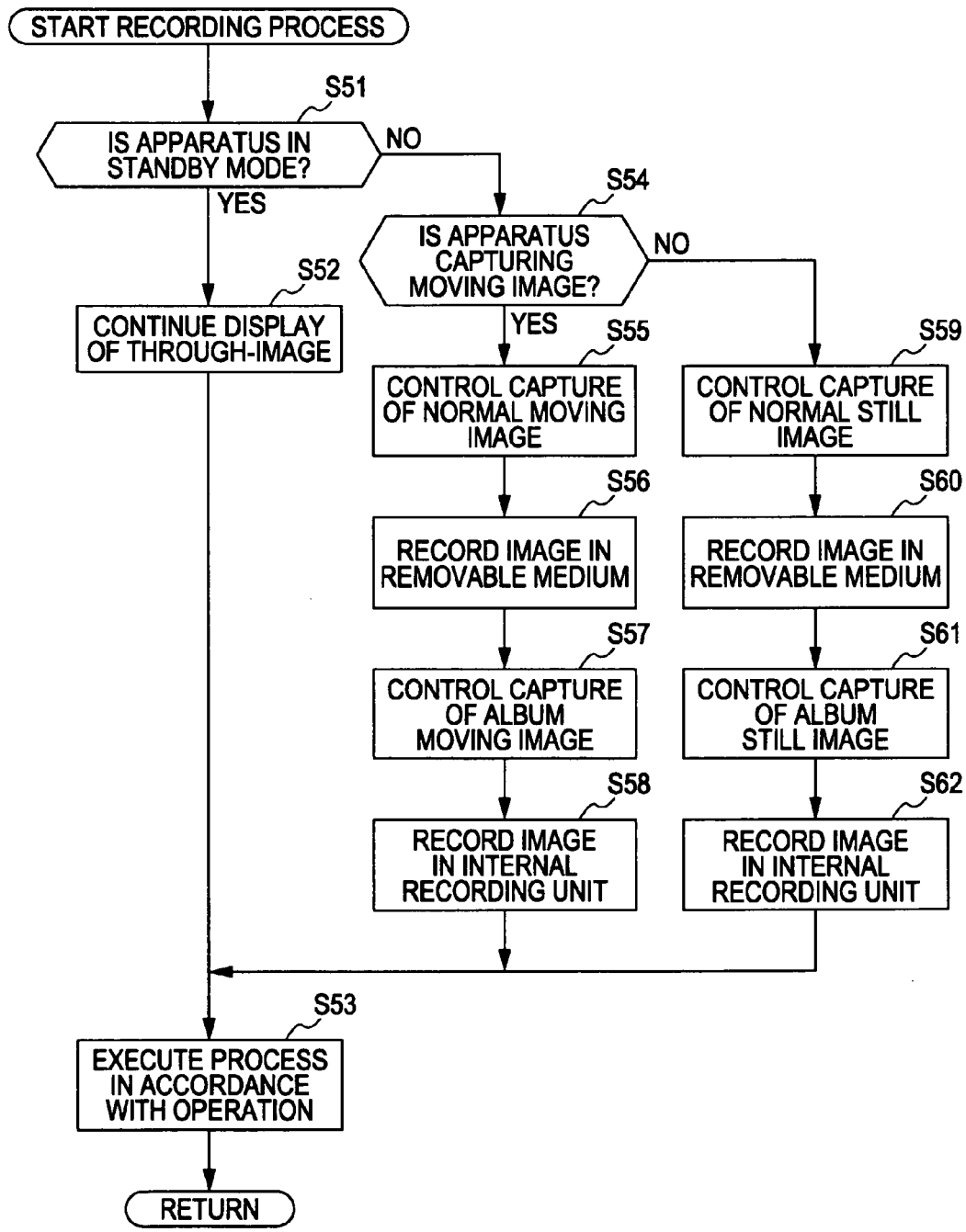
FIG. 7 is a flowchart of the recording process.

The recording process in step S32 in FIG. 6 will now be described with reference to a flowchart of FIG. 7.

In step S51, it is determined whether the present apparatus is in a standby mode for still-image or moving-image capture. For example, it is assumed that the display unit 34 (FIG. 2) displays a through-the-lens image (hereinafter, referred to as a through-image) for confirmation of the angle of view of an image to be captured. In this state, when the user operates the shutter button 32 (FIG. 1) or the recording button 33 (FIG. 1), the input unit 61 supplies a signal indicating an image-capture instruction to the control unit 60. When receiving this signal from the input unit 61, the control unit 60 determines that the present apparatus is not in the image-capture standby mode (i.e., this standby mode is not released).

On the other hand, if it is determined in step S51 that the present apparatus is in the image-capture standby mode, the process proceeds to step S52. The through-image is continuously displayed. While the through-image is continuously displayed, the control unit 60 executes a process based on the user operation in step S53. For example, when it is determined that the user instructs to turn off the apparatus, a process of turning off the apparatus is executed.

On the other hand, when it is determined in step S51 that the present apparatus is not in the image-capture standby mode, the process proceeds to step S54. Then, whether a moving image is being captured is determined. For instance, when the user operates the recording button 33 and the imaging control unit 141 controls the imaging unit 51 to shoot a subject, the control unit 60 determines that the apparatus is capturing a moving image.

When it is determined in step S54 that the present apparatus is capturing a moving image, the process proceeds to step S55. The imaging control unit 141 continuously controls the imaging unit 51 to capture a moving image. In step S55, a captured moving image is a moving image for normal recording. The moving image for normal recording is recorded onto the removable medium 91. This image is compressed at a compression ratio set by the user and is user-editable.

In making an association between the above description and the foregoing description, a moving image for normal recording is viewable and editable through an external device having an editing function while the external device is connected to the present apparatus. In this specification, "moving image for normal recording" will also be called "normal moving image"

As will be described below, for example, in step S59, capturing a still image for normal recording is controlled. A still image for normal recording is handled in a manner similar to the above-described moving image for normal recording. In other words, a still image for normal recording is viewable and editable through the above-described external device while the device is connected to the present apparatus. In this specification, "still image for normal recording" will also be called "normal still image".

Capturing a normal moving image will now be described with reference to FIG. 2. The imaging unit 51 images a subject to generate a voltage signal and supplies the signal as an image signal through the AD conversion unit 52 to the signal processing unit 55. The microphone 53 collects surrounding sounds, converts the sounds into an audio signal, serving as an electric signal, and supplies the signal through the AD conversion unit 54 to the signal processing unit 55.

Under the control of the imaging control unit 141, as necessary, the signal processing unit 55 performs predetermined processing, e.g., gamma correction, on the image signal and the audio signal supplied from the AD conversion units 52 and 54 to generate moving-image data and audio data and supplies the generated data through the RAM 56 to the compression/decompression unit 58.

Under the control of the recording control unit 142, the compression/decompression unit 58 compresses the supplied moving-image data in a predetermined standard, e.g., Moving Picture Experts Group phase 2 (MPEG-2), thus generating compressed moving-image data. Simultaneously, the compression/decompression unit 58 compresses the supplied audio data in a predetermined standard, e.g., Advanced Audio Coding (AAC), thus generating compressed audio data.

The compression/decompression unit 58 compresses moving-image data at a compression ratio set by the user. In other words, the image processing apparatus 11 is designed so that the user can select (set) a desired compression ratio when the user operates the present apparatus to record a moving image as a normal moving image onto the removable medium 91.

The compression/decompression unit 58 extracts predetermined still images, i.e., video frames from the moving image displayed on the basis of the generated moving-image data to generate thumbnail-image data. For example, when the user wants to know what moving images the removable medium 91 contains, the user refers to thumbnail-image data.

The compression/decompression unit 58 supplies the generated moving-image data, audio data, and thumbnail-image data to the removable medium 91. In the following description, moving-image data, audio data, and thumbnail-image data recorded on the removable medium 91 will be collectively described as a moving-image file (i.e., it is assumed that each moving-image file contains moving-image data, audio data, and thumbnail-image data).

In step S56, the external-recording control section 152 (FIG. 3) controls the recording process such that the moving-image file is recorded onto the removable medium 91.

As described above, a moving-image file for normal recording is generated and is then recorded onto the removable medium 91. On the other hand, in step S57, capturing a moving image for image album is controlled. In this specification, "moving image for image album" will also be called "album moving image". In this instance, each album moving image is recorded in the area 181 (FIG. 4) in the internal recording unit 59. The album moving image is compressed at a predetermined compression ratio which is not set by the user. The album moving image is uneditable by the user.

In making an association between the above description and the foregoing description, an album moving image is unviewable and uneditable through an external device having an editing function while the external device is connected to the present apparatus.

As for album moving images, for example, the user views the album moving images to search for moving images previously captured by the image processing apparatus 11. The album moving images are used to realize a function called, e.g., "image album".

As will be described below, for example, in step S61, capturing a still image for image album is controlled. In this specification, "still image for image album" will also be called "album still image". An album still image is handled in a manner similar to the above-described album moving image. In other words, an album still image is unviewable and uneditable through the above-described external device while the device is connected to the present apparatus.

Fundamentally, an album moving image is captured in the same way as a normal moving image. However, the amount of each album moving image is basically smaller than that of each normal moving image (because each album moving image is compressed at the predetermined compression ratio as described above). Accordingly, the compression process in capturing a normal moving image is different from that in capturing an album moving image. The difference therebetween will now be described with reference to FIG. 8.

Figure 8:
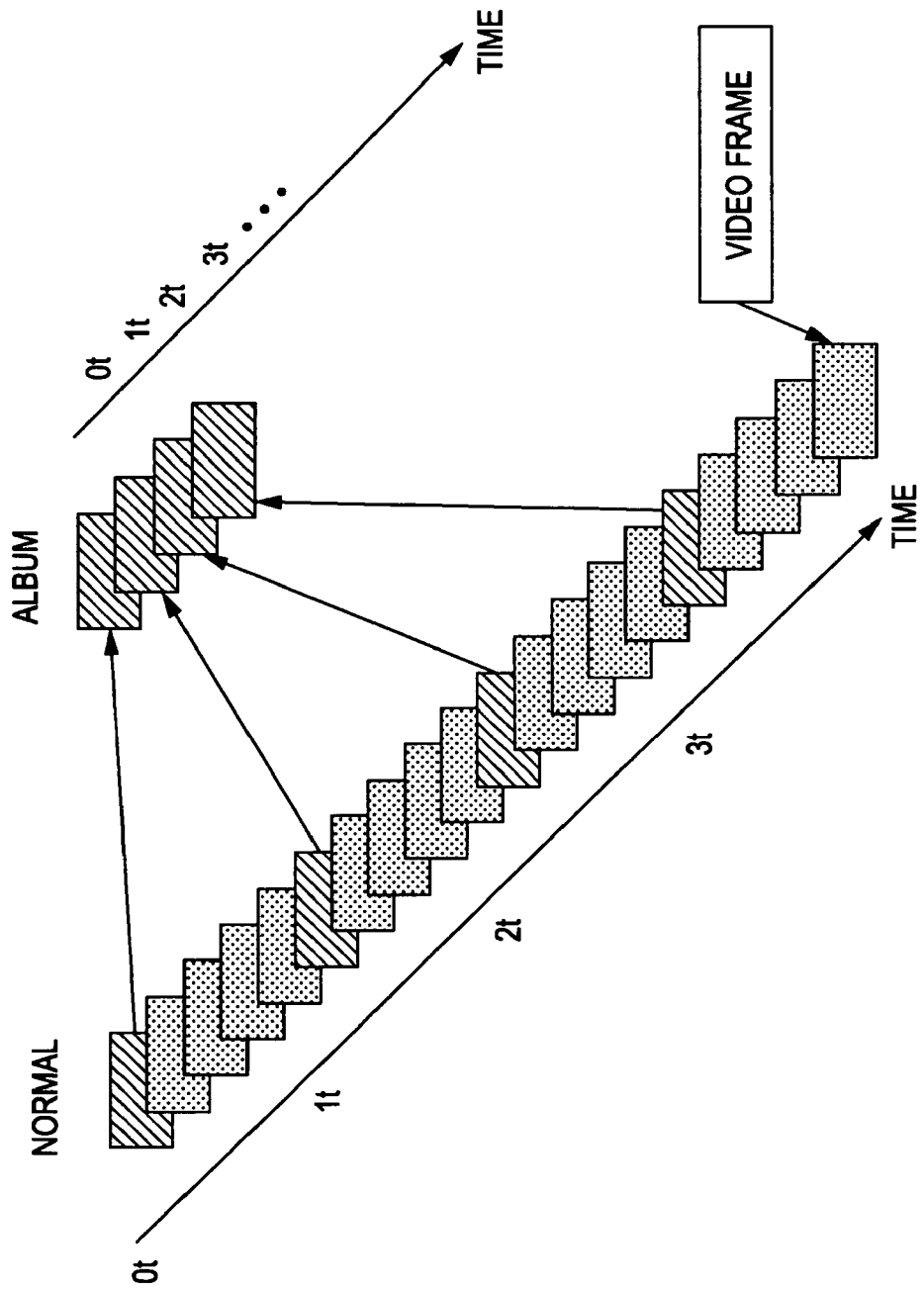
FIG. 8 is a diagram explaining a moving image for image album.

FIG. 8 shows video frames of a normal moving picture and those of an album moving image arranged in parallel to compare the normal and album moving images. The video frames of the normal moving image are shown in the left part of FIG. 8. The video frames of the album moving image are shown in the right part thereof.

In FIG. 8, reference symbol "t" denotes a predetermined time interval. In other words, the time interval t elapses between time points $0t$ and $1t$ and the time interval t elapses between time points $1t$ and $2t$. Similarly, the time interval t elapses between time points $2t$ and $3t$.

As for the video frames of the normal moving image, a video frame is extracted every time interval t. The extracted video frames serve as video frames constituting the album moving image. In other words, the album moving image is generated using the video frames extracted from the normal moving image at every predetermined timing.

The internal-recording control section 151 (FIG. 3) controls capture of an album moving image so as to perform the above-described image generation. In step S58 (FIG. 7), the internal-recording control section 151 executes the control operation such that the generated album moving image file is recorded in the area 181 in the internal recording unit 59. As described above, the album moving image is recorded in the area 181 in the internal recording unit 59.

In this manner, a moving image captured in one-time shooting is recorded in each of the internal recording unit 59 and the removable medium 91. The moving images recorded in the internal recording unit 59 and the removable medium 91 are different in compression ratio. Since the user can set the compression ratio for normal moving images, the moving images in the internal recording unit 59 and the removable medium 91 may be compressed at the same compression ratio. However, when an album moving image is generated from a normal moving image as described above with reference to FIG. 8, the compression ratio of the album moving image is always higher than that of the normal moving image, i.e., the amount of data of the album moving image is smaller than that of the normal moving image.

After the moving image is recorded as described above, the process proceeds to step S53. Since step S53 has already been explained, the description thereof is omitted.

When it is determined in step S54 that the present apparatus is not capturing a moving image, the process proceeds to step S59. In step S59, capturing a normal still image is controlled. When the user operates the shutter button 32 (FIG. 1), the input unit 61 supplies a signal indicating a still-image capture instruction to the control unit 60. When the control unit 60 receives this signal from the input unit 61, the imaging control unit 141 allows the imaging unit 51 to image a subject.

Under the control of the imaging control unit 141, the imaging unit 51 images the subject to generate an image signal. The image signal is processed through the AD conversion unit 52 and the signal processing unit 55, thus generating still-image data. The still-image data is supplied to the RAM 56. Under the control of the recording control unit 142, the compression/decompression unit 58 compresses the still-image data supplied from the RAM 56 in a predetermined standard, e.g., Joint Photographic Experts Group (JPEG), thus generating compressed still-image data. In addition, the compression/decompression unit 58 generates thumbnail-image data on the basis of the generated still-image data and then supplies the generated still-image data and thumbnail-image data to the removable medium 91.

In the following description, still-image data and thumbnail-image data recorded on the removable medium 91 will be collectively described as a still-image file (i.e., it is assumed that each still-image file includes still-image data and thumbnail-image data).

In step S60, the external-recording control section 152 (FIG. 3) controls the recording operation such that the still-image file is recorded onto the removable medium 91.

As described above, the still-image file for normal recording is generated and is recorded onto the removable medium 91. On the other hand, in step S61, capturing an album still image is controlled. As described above, the relationship between a normal still image and an album still image has the same as that between a normal moving image and an album moving image. In other words, the difference between the normal still image and the album still image is whether or not the still image is viewable through an external device.

The normal still image is compressed at a compression ratio set by the user and is recorded on the removable medium 91 such that the still image is viewable and editable through the external device. The album still image is compressed at the predetermined compression ratio and is recorded in the area 181 (FIG. 4) in the internal recording unit 59 such that the still image is protected from being viewed and edited through the external device.

In step S61, the still-image data is compressed at the predetermined compression ratio. In step S62, the compressed still-image data is recorded onto the internal recording unit 59.

In a manner similar to a moving image, a still image captured in one-time shooting is compressed at different compression ratios and the obtained still images are recorded onto the internal recording unit 59 and the removable medium 91, respectively.

After the still images are recorded as described above, the process proceeds to step S53. Since step S53 has already been explained, the description thereof is omitted.

In this manner, the process of recording moving images or still images is executed such that the same image data is recorded in each of the internal recording unit 59 and the removable medium 91. As described above, the recording process is executed such that the amount of data recorded in the internal recording unit 59 is smaller than that of data recorded in the removable medium 91. Consequently, the internal recording unit 59 can record more data than the removable medium 91 records.

In the above description, the same image data is recorded in each of the internal recording unit 59 and the removable medium 91, i.e., two recording media. Image data may be simultaneously recorded in three or more recording media. In recording image data onto a plurality of recording media, the image data may be processed, e.g., compressed so that the amounts of data vary from medium to medium.

In the above-described recording process, image data of a captured moving or still image is recorded onto the internal recording unit 59 and the removable medium 91 such that the amount of data recorded in the internal recording unit 59 is different from that in the removable medium 91. Image data may be compressed by different compression standards and the resultant compressed data sets may be recorded onto the internal recording unit 59 and the removable medium 91, respectively.

In the recording process described with reference to FIG. 7, moving images and/or still images are sequentially recorded onto the internal recording unit 59. However, since the internal recording unit 59 includes a recording medium having a limited capacity, i.e., the recording capacity of the area 181 is limited, moving images and still images cannot be recorded without limitation. In some cases, therefore, in recording a moving image or a still image onto the internal recording unit 59 in step S58 or S62, there is no available space to record the moving image or still image in the area 181.

Therefore, in steps 58 and S62, a deletion process may be performed before recording. The deletion will now be described with reference to FIG. 9. In an example of the area 181 shown in FIG. 9, an image file 6 shown in part A is recorded in addition to image files 1 to 5 shown in part B.

Figure 9:
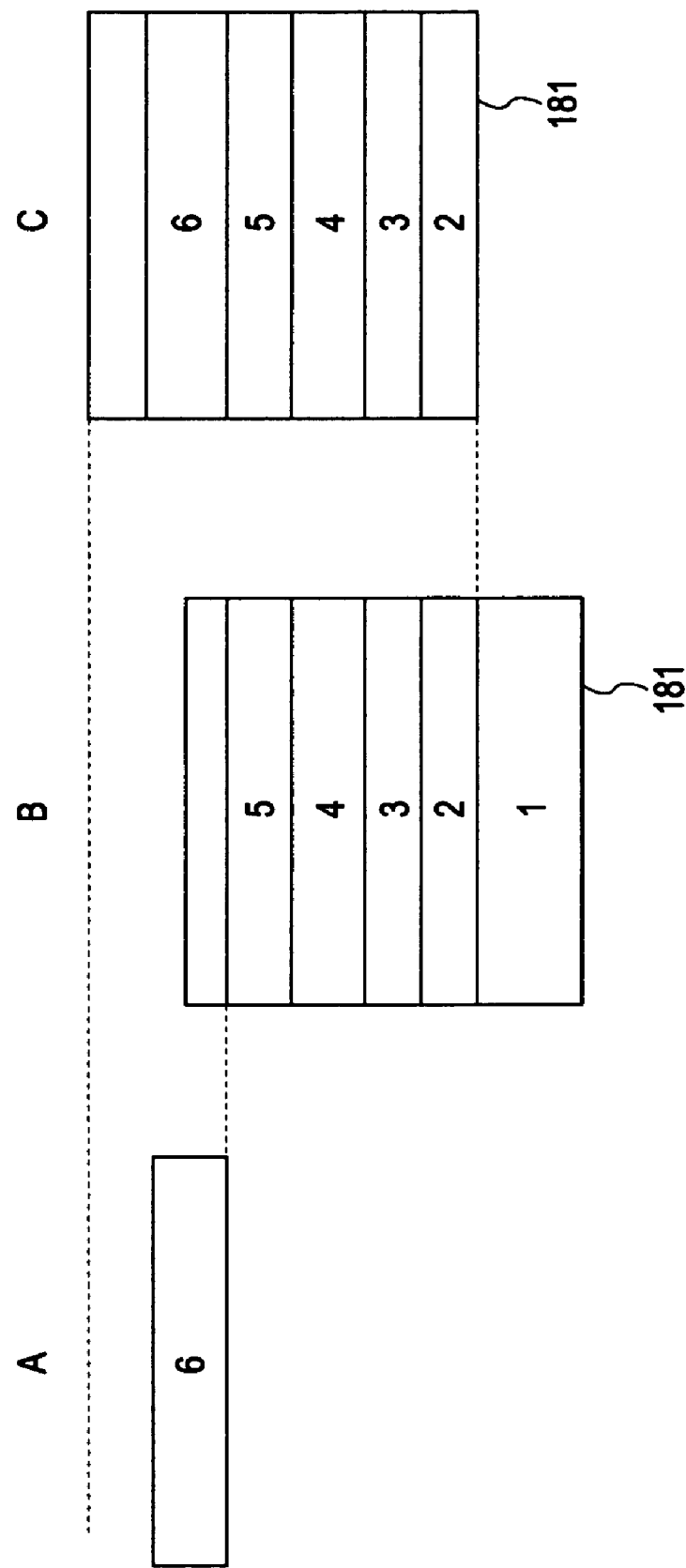
FIG. 9 is a diagram explaining deletion of image data.

Referring to part B of FIG. 9, the image files 1 to 5 are sequentially generated and recorded in this order. In other words, the image file 1 is the oldest file. Since the amount of the image file 6 is larger than the remaining capacity of the area 181 in which the image files 1 to 5 have already been recorded, the image file 6 cannot be recorded unless any file recorded in the area 181 is deleted.

Consequently, the image file 1 that is the oldest in terms of time is deleted. When the image file 1 is deleted, an enough space to record the image file 6 is created in the area 181, so that the image file 6 is additionally recorded in the area 181 as shown in part C of FIG. 9. If an enough space to record the image file 6 is not provided in the area 181 by deleting the image file 1, the second oldest image file 2 is also deleted.

In this manner, the image files recorded in the area 181 are deleted in the order in which images contained in the image files were captured, i.e., in capturing (shooting) order from oldest to newest until an enough space to record at least a new image file is provided.

The present apparatus is fundamentally designed such that image files recorded in the area 181 are not processed, e.g., edited. The present apparatus may include a protecting function so that image files recorded in the area 181 are not targeted in the above-described deletion process. For instance, it is assumed that the user sets the attribute of the image file 1 in part B of FIG. 9 so that the file 1 is protected. When the image file 6 is recorded, the oldest image file 1 is normally targeted for deletion and is then deleted. However, since the image file 1 is protected, it is not deleted.

Accordingly, the image file 2, which is not protected, is targeted for deletion and is then deleted. As described above, an unprotected image file may be deleted.

Image files recorded in the internal recording unit 59 and the removable medium 91 as described above are played and provided to the user. At that time, the image files recorded in the area 181 in the internal recording unit 59 can be used as an image album as described above. Using the image files as an image album means that the user can sequentially view images captured previously. In this specification, sequential viewing means that the user can view images in date order, e.g., in shooting date order from oldest to newest.

Figure 10:
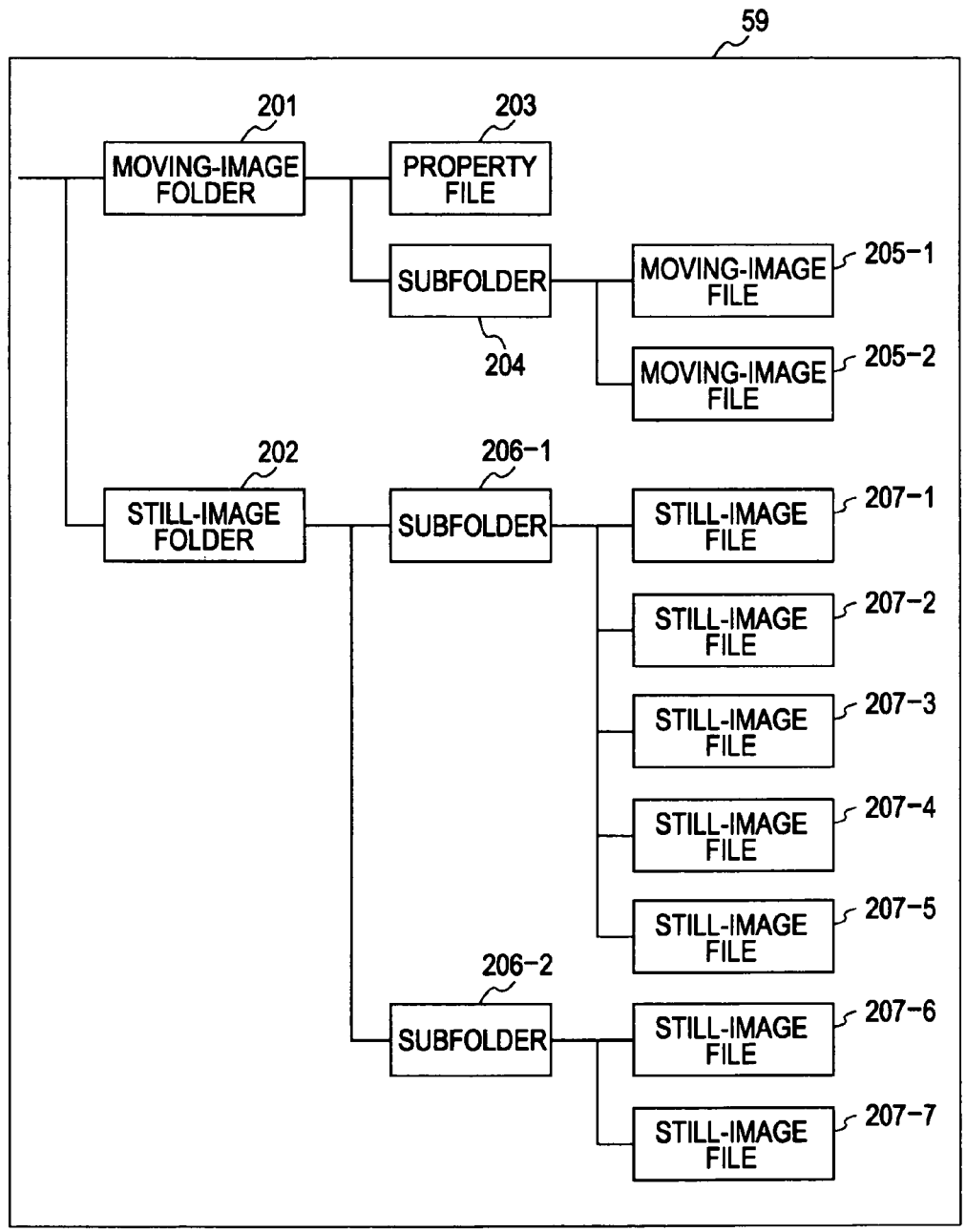
FIG. 10 is a diagram explaining folders.

To allow the user to view images in date order, image files are recorded in a file structure (data structure), as shown in FIG. 10, in the area 181 of the internal recording unit 59. Referring to FIG. 10, the image files are recorded in the area 181 such that each image file is stored in a moving-image folder or a still-image folder.

In FIG. 10, the internal recording unit 59 (FIG. 2) contains a moving-image folder 201 for storage of moving-image files and a still-image folder 202 for storage of still-image files.

The moving-image folder 201 includes a property file 203 and a subfolder 204. The property file 203 is used for management of moving-image files and still-image files. The subfolder 204 stores moving-image files. In this case, the subfolder 204 contains moving-image files 205-1 and 205-2.

In the following description, when the moving-image files 205-1 and 205-2 need not be distinguished from each other, they will simply be referred to as moving-image files 205. Each of the moving-image files 205 is generated and recorded in steps S57 and S58 in FIG. 7.

The still-image folder 202 contains subfolders 206-1 and 206-2 for storage of still-image files. The subfolder 206-1 contains still-image files 207-1 to 207-5 and the other subfolder 206-2 contains still-image files 207-6 and 207-7.

In the following description, when the subfolders 206-1 and 206-2 need not be distinguished from each other, they will simply be called subfolders 206. Furthermore, in the following description, when the still-image files 207-1 to 207-7 need not be distinguished from each other, they will simply be called still-image files 207. Each still-image file 207 is generated and recorded in steps S61 and S62 in FIG. 7.

The property file 203 includes information indicating the virtual directory structure of the internal recording unit 59. The property file 203 is updated through a process by the internal-recording control section 151 (FIG. 3) each time a moving-image file 205 or a still-image file 207 is newly recorded onto the internal recording unit 59.

In other words, since the property file 203 is provided, when the internal-recording control section 151 controls recording of an album moving-image file (moving-image file 205) or an album still-image file (still-image file 207), the section 151 also executes a process of updating the property file 203.

For example, when a new moving-image file 205 or still-image file 207 is recorded in the internal recording unit 59, the internal-recording control section 151 updates the property file 203 recorded in the internal recording unit 59 on the basis of information (e.g., Exif information) included in the recorded moving-image file 205 or still-image file 207.

As described above, in the directory structure shown in FIG. 10, the property file 203 is provided, the moving-image files 205 are stored in the moving-image folder 201, and the still-image files 207 are stored in the still-image folder 202. As will be described below, the property file 203 includes information indicating the virtual directory structure in which image files are arranged in shooting date order, i.e., files are sorted by date.

If such a regular arrangement that the moving-image folder 201 contains the moving-image files 205 and the still-image folder 202 contains the still-image files 207 as shown in FIG. 10 is not made, as long as the property file 203 including the information indicating the virtual directory structure is provided, image files can be managed in an orderly fashion only with reference to the property file 203.

For instance, assuming that the moving-image files 205 and the still-image files 207 are contained in one folder, the user can reorder the files by date or classify the files into a moving-image file group and a still-image file group by referring to the property file 203. Although it is assumed that data is stored in the directory structure as shown in FIG. 10 in the following description, the moving-image folder 201 and the still-image folder 202 may be omitted (i.e., simple folders may be provided), alternatively, the moving-image files 205 and the still-image files 207 may be contained in one folder.

The property file 203 may be used as a management file for management of image files recorded in each predetermined folder.

Figure 11:
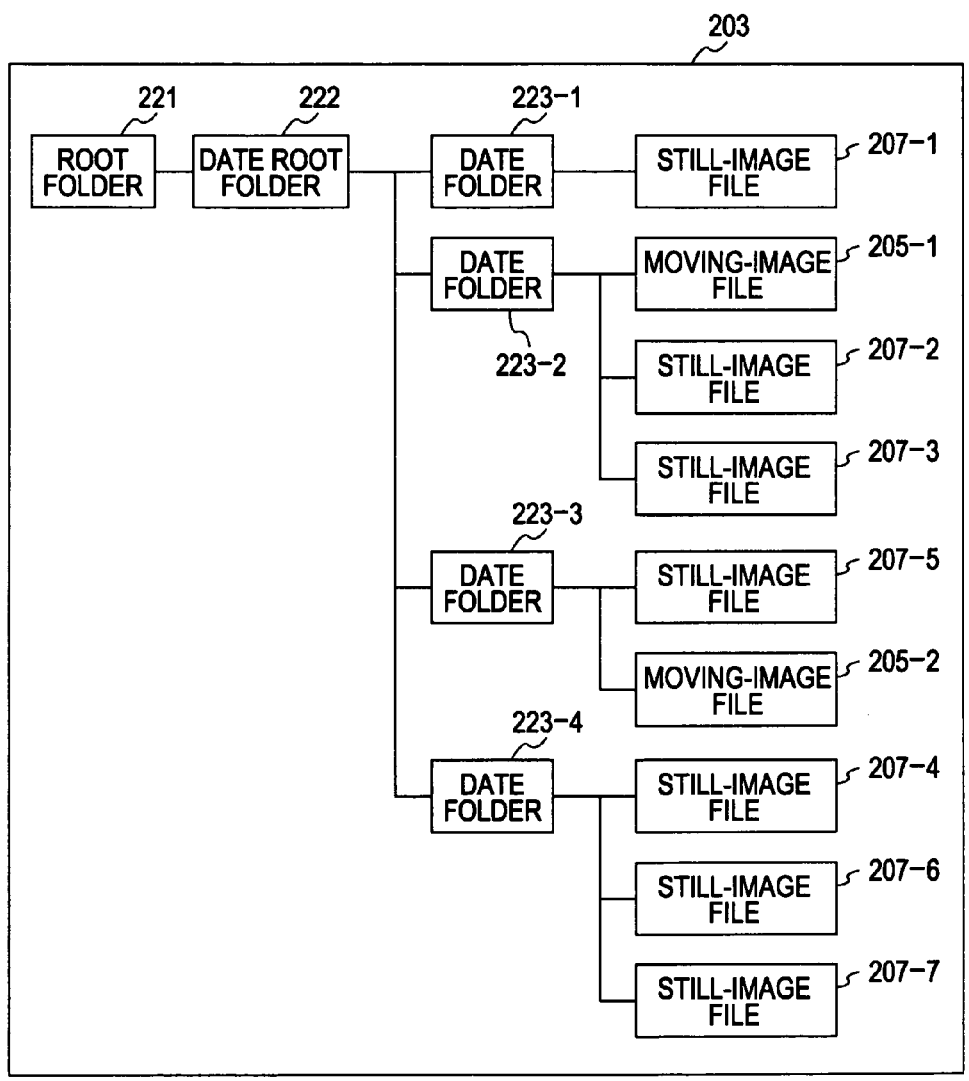
FIG. 11 is a diagram explaining folders.

The property file 203 includes information indicating the virtual directory structure as shown in FIG. 11. In FIG. 11, the same elements as those in FIG. 10 are designated by the same reference numerals and a description thereof is appropriately omitted.

Referring to FIG. 11, a root folder 221 contains a date root folder 222. In addition, the date root folder 222 contains date folders 223-1 to 223-4. A predetermined date is assigned as a folder name to each of the date folders 223-1 to 223-4. The date folders 223-1 to 223-4 are arranged in date order on the basis of the folder names.

The moving-image files 205 and still-image files 207 are recorded such that each image file is stored in the corresponding date folder with the folder name indicating the same date as shooting date of the image file.

The date folder 223-1 contains the still-image file 207-1. The date folder 223-2 contains the moving-image file 205-1 and the still-image files 207-2 and 207-3 ordered by shooting date and time.

The date folder 223-3 contains the still-image file 207-5 and the moving-image file 205-2 ordered by shooting date and time. The date folder 223-4 contains the still-image files 207-4, 207-6, and 207-7 ordered by shooting date and time.

For example, assuming that the folder name of the date folder 223-3 is "2005.08.01" indicating Aug. 1, 2005 and the still-image file 207-5 and the moving-image file 205-2 include images captured on Aug. 1, 2005, the still-image file 207-5 and the moving-image file 205-2 are stored in the date folder 223-3.

In the following description, if it is necessary to distinguish between the date folders 223-1 to 223-4, they will simply be called date folders 223.

FIG. 11 relates to the case where the information included in the property file 203 (FIG. 10) indicates the virtual directory structure in which the moving-image files 205 and the still-image files 207 are classified by date and are stored in a virtual manner in the respective date folders 223. The classification of folders is not limited to that based on date. The property file 203 may include information indicating a virtual directory structure in which the classification of folders is based on exposure value or position information obtained by a GPS. The property file 203 may include information indicating a plurality of virtual directory structures.

In the above description, the property file 203 includes the information indicating the virtual directory structure. The property file 203 may include information regarding the relationship between image files recorded in the internal recording unit 59 with respect to file name, exposure value, shooting date and time, and GPS position information.

As described above, the moving-image folder 201 in FIG. 10 contains the property file 203 including the information indicating the virtual directory structure. In the image processing apparatus 11, therefore, the user can easily retrieve (view) a moving-image file 205 or a still-image file 207 satisfying predetermined conditions, e.g., an image file 205 or 207 obtained on a predetermined date from the moving-image files 205 and the still-image files 207 recorded in the internal recording unit 59 by referring to the property file 203.

Since the property file 203 is provided as described above, as will be explained below, images can be displayed in, e.g., date order during playback of images recorded in the area 181 in the internal recording unit 59, i.e., during selection (retrieval) of images to be played. For instance, images captured by the image processing apparatus 11 can be displayed in order from oldest to newest like an image album.

Data recorded in the area 181 in the internal recording unit 59 can be viewed as an image album as described above. In addition, since the area 181 is unviewable through an external device having a function capable of editing data while the device is connected to the present apparatus, the data recorded in the area 181 is also unviewable. On the other hand, data recorded on the removable medium 91 is recorded in a permissible area that is viewable through such an external device while the device is connected to the present apparatus.

Since the removable medium 91 is a recording medium removable from the image processing apparatus 11, this medium may be removed from the image processing apparatus 11 and be attached to a printer or a personal computer. In this case, it is preferred that an image file be recorded on the removable medium 91 in a generally used standard, e.g., Design rule for Camera File system (DCF), such that the recorded image file can be recognized through another apparatus, such as a printer, to which the removable medium 91 is attached.

When an image file, such as a moving-image file generated in step S55 or a still-image file generated in step S59, is supplied to the removable medium 91 and is recorded therein in step S56 or S60, the image file is recorded in the predetermined standard, e.g., DCF. In the removable medium 91, as shown in FIG. 12, each image file is stored in the corresponding moving-image or still-image folder.

Figure 12:
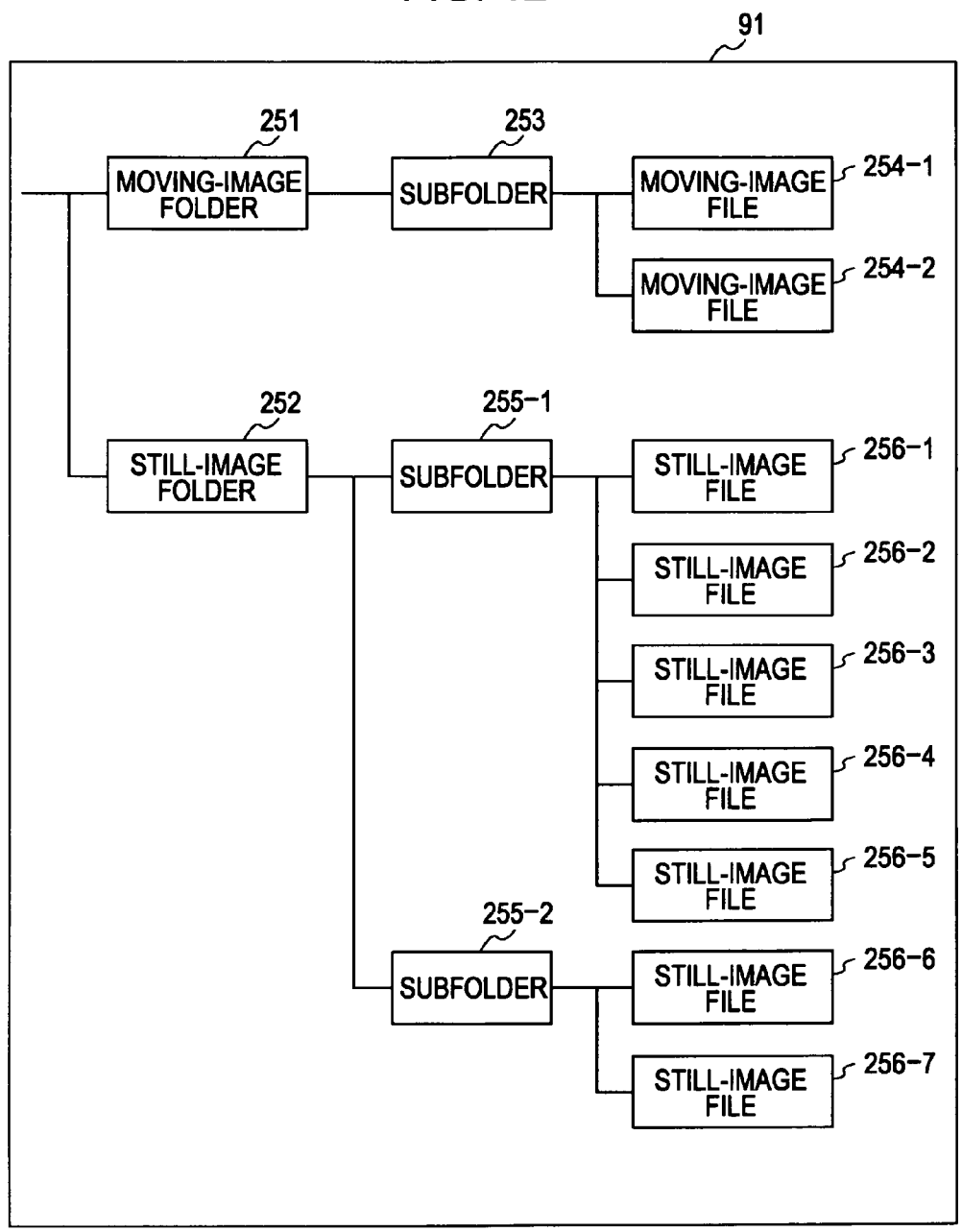
FIG. 12 is a diagram explaining folders.

Referring to FIG. 12, the removable medium 91 (FIG. 2) contains a moving-image folder 251 for storage of moving-image files and a still-image folder 252 for storage of moving image files.

The moving-image folder 251 contains a subfolder 253 for storage of moving-image files. In the subfolder 253, moving-image files 254-1 and 254-2 are stored such that they are arranged in the order in which moving images contained in the image files were captured, i.e., in capturing (shooting) order. In the following description, when it is unnecessary to distinguish between the moving-image files 254-1 and 254-2, they will simply be called moving-image files 254.

The still-image folder 252 contains subfolders 255-1 and 255-2 for storage of still-image files. In the subfolder 255-1, still-image files 256-1 to 256-5 are stored such that they are arranged in shooting order. In the subfolder 255-2, still-image files 256-6 and 256-7 are stored such that they are arranged in shooting order.

In the following description, when it is unnecessary to distinguish between the subfolders 255-1 and 255-2, they will simply be called subfolders 255. In addition, when it is unnecessary to distinguish between the still-image files 256-1 to 256-7, they will simply be called still-image files 256.

A process of reading any of image files recorded in the area 181 in the internal recording unit 59 and the removable medium 91 as described above and playing the read image file will now be described. In other words, the process in step S33 in FIG. 6 will now be explained, step S33 following step S31 in which it is determined that the recording mode is not selected during turn on of the image processing apparatus 11.

Figure 13:
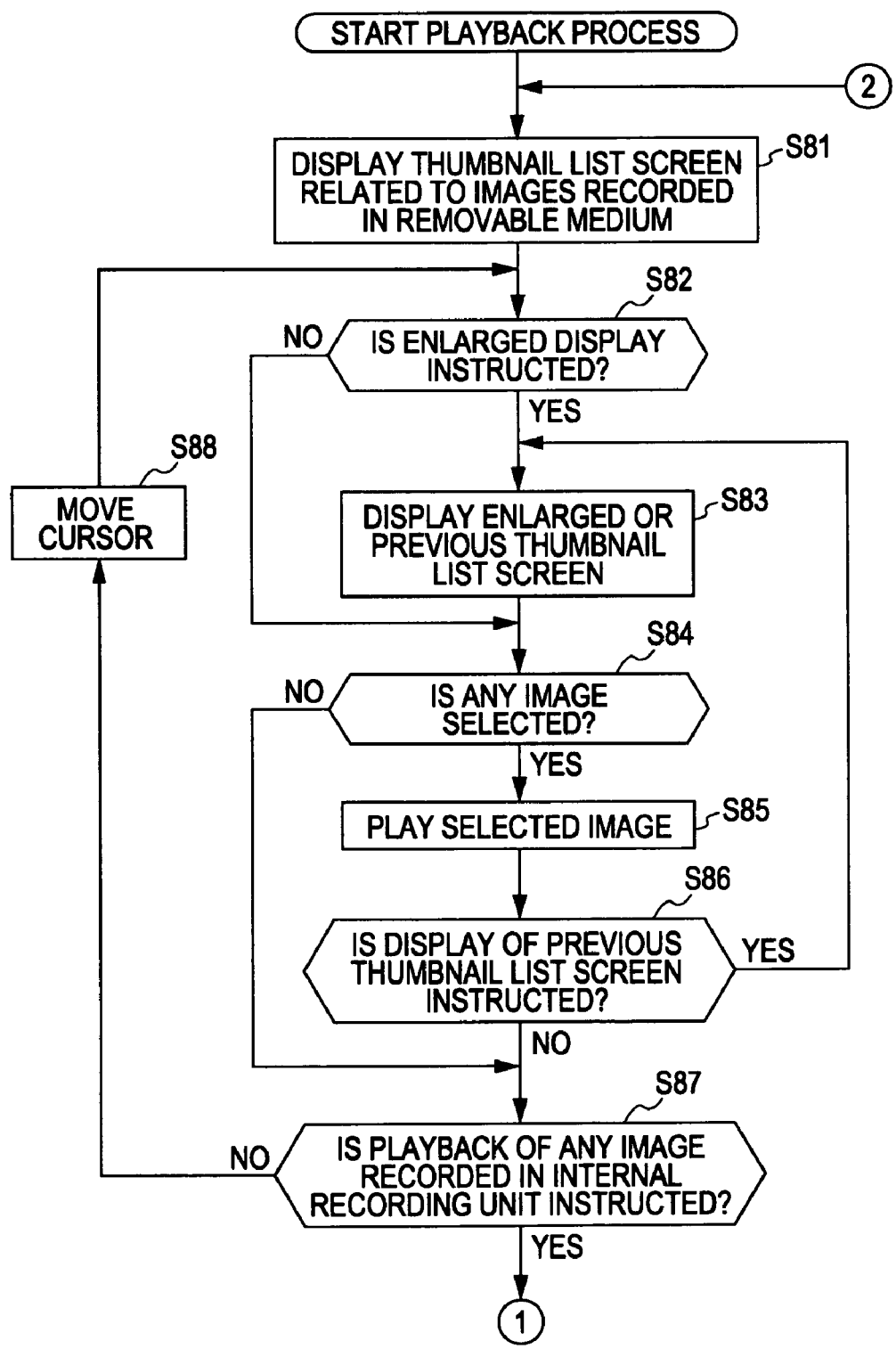
FIG. 13 is a flowchart of the playback process.
Figure 14:
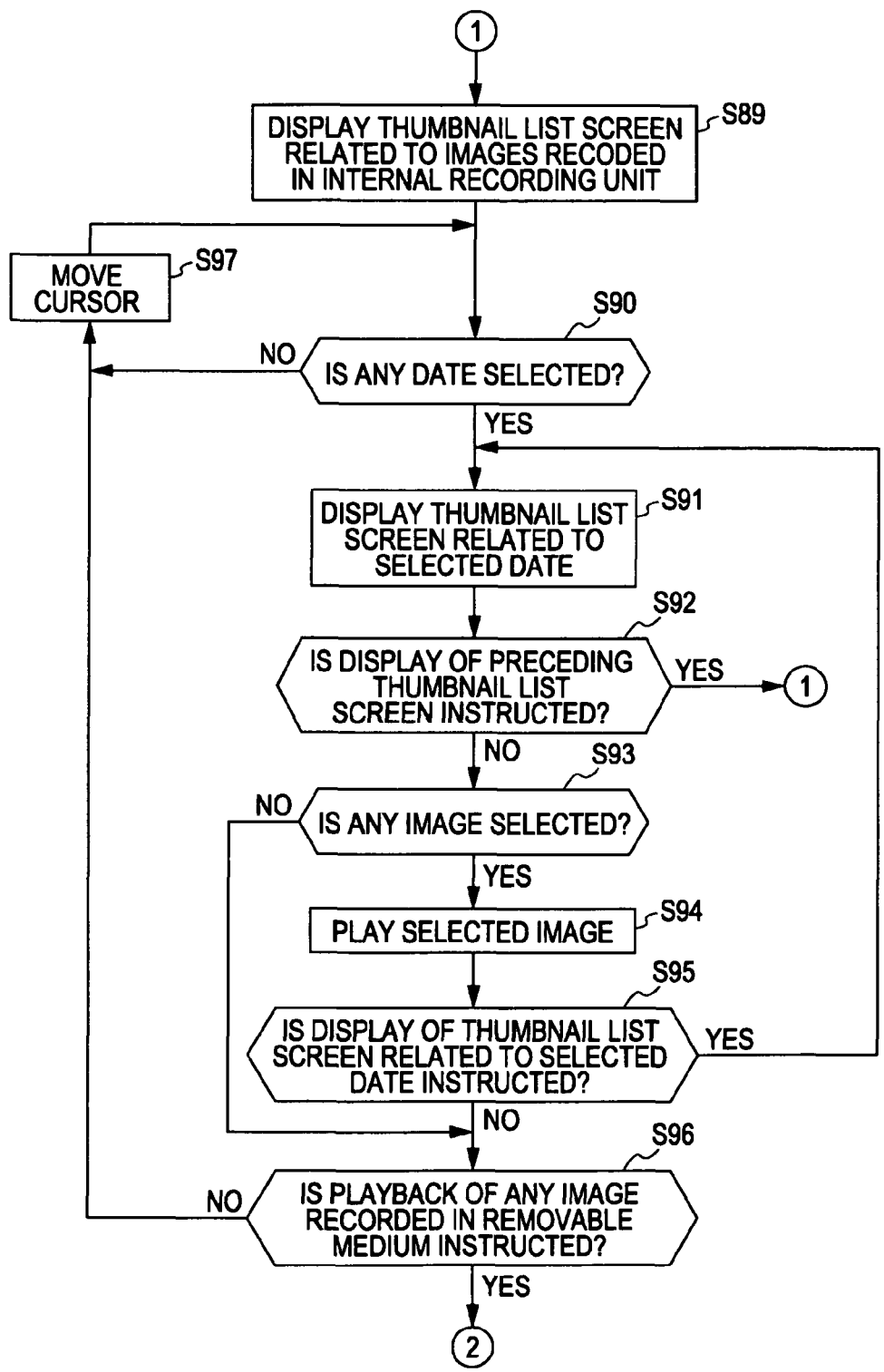
FIG. 14 is the flowchart of the playback process, FIG. 14 being continued from FIG. 13.

FIGS. 13 and 14 show a flowchart of the playback process executed in step S33. When it is determined that a playback mode is selected, a thumbnail list screen related to images recorded on the removable medium 91 is displayed in the display unit 34 (FIG. 2) in step S81.

For example, when the user operates the input unit 61 (FIG. 2) to select the playback mode, the external-playback control section 162 (FIG. 3) obtains thumbnail-image data included in the image files recorded in the removable medium 91 in accordance with an input signal supplied from the input unit 61, thus generating image data for display of the thumbnail list screen on the basis of the obtained thumbnail-image data. The external-playback control section 162 supplies the generated image data to the display unit 34, thus displaying the thumbnail list screen.

The following description will be made on the assumption that a thumbnail list of images recorded in the removable medium 91 is displayed by default when the playback mode is selected. In this case, since image data is recorded in the internal recording unit 59 and the removable medium 91, i.e., two different recording media, the image data in the two recording media can be played independently. Accordingly, the user may select any of recording media. Alternatively, one of the recording media may be selected by default and image data recorded in the selected medium may be played. It is a matter of course that the present apparatus may be designed such that after playback starts, the user can change a recording medium to be played.

Figure 15A:
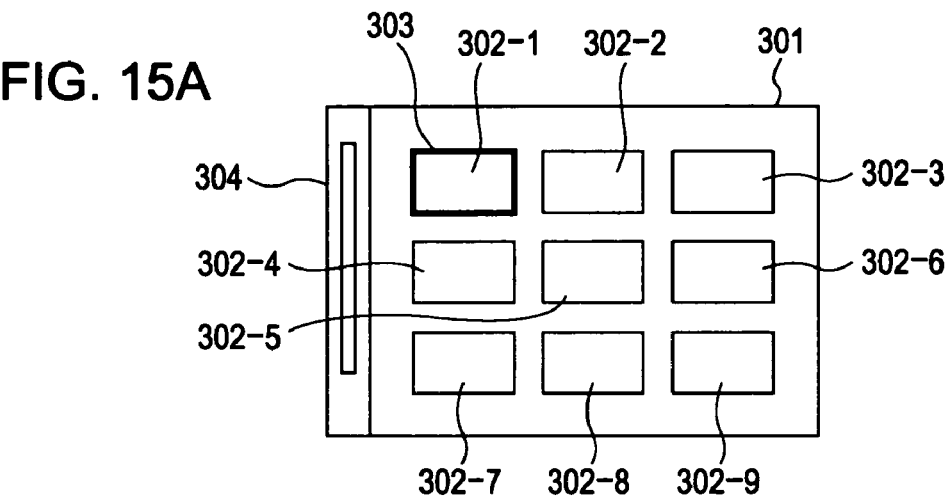
FIGS. 15A to 15C are diagrams showing examples of displayed screens.

FIG. 15A shows an example of the thumbnail list screen related to images recorded in the removable medium 91, the list screen being displayed in the display unit 34. A thumbnail list screen 301 shown in FIG. 15A includes thumbnail images 302-1 to 302-9. FIG. 15A shows the example in which nine thumbnail images are displayed. The number of thumbnail images is not limited to the above example. For instance, 16 thumbnail images may be displayed. Since the thumbnail list screen 301 is displayed with reference to the removable medium 91 having the directory structure shown in FIG. 12, the images are displayed (played) in recording (shooting) order, i.e., in order from oldest to newest.

In the thumbnail list screen 301, a cursor 303 for selecting any of the thumbnail images 302 is also displayed. Furthermore, a scroll bar 304 used for display of undisplayed thumbnail images is also displayed on the left side of the thumbnail list screen 301.

When the above-described thumbnail list screen 301 is displayed in step S81, whether enlarged display is instructed is determined in step S82. Enlarged display means that the size of each displayed thumbnail image increases (i.e., each thumbnail image is enlarged) due to a reduction in the number of thumbnail images displayed in one screen.

Figure 15B:
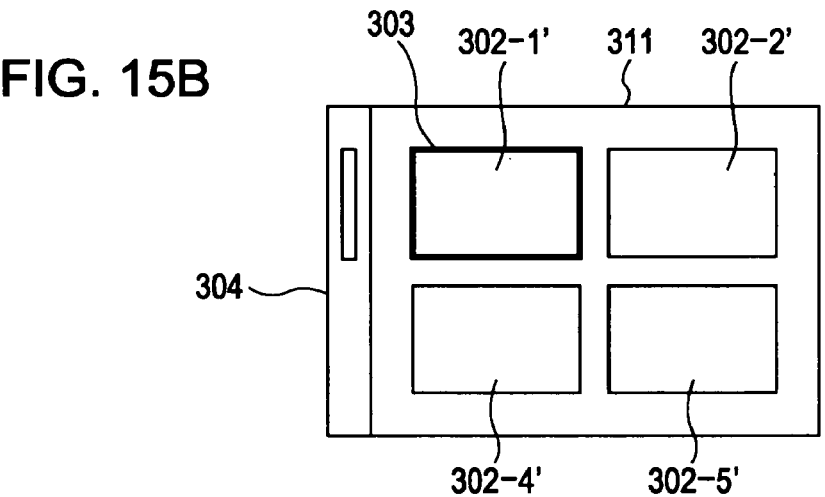

FIG. 15B shows an example of an enlarged thumbnail list screen. In this example, a thumbnail list screen 311 includes thumbnail images 302-1', 302-2', 302-4', and 302-5'. The thumbnail list screen 311 shown in FIG. 15B is displayed when the cursor 303 is positioned at the thumbnail image 302-1 in the screen 301 and enlarged display is instructed.

In this instance, the thumbnail images 302-1, 302-2, 302-4, and 302-5 included in the thumbnail list screen 301 in FIG. 15A are enlarged, so that the thumbnail images 302-1', 302-2', 302-4', and 302-5' are displayed in the thumbnail list screen 311 in FIG. 15B. In FIG. 15B, the mark included in, e.g., 302-1' is added to indicate that the thumbnail image 302-1' is the same as the thumbnail image 302-1 but the image 302-1' is enlarged (i.e., the display size of each image is different from that of the original image).

Again referring to FIG. 13, when it is determined in step S82 that enlarged display is instructed, the process proceeds to step S83. In step S83, the thumbnail list screen 301 is enlarged. In other words, the thumbnail list screen 301 shown in FIG. 15A is changed to the thumbnail list screen 311 shown in FIG. 15B in the display unit 34.

An enlarged-display instruction is given when the user operates, e.g., the arrow keys 35. The user can instruct enlarged display by operating the arrow key 35-2 or 35-4.

On the other hand, if it is determined in step S82 that enlarged display is not instructed, the process proceeds to step S84. In step S84, whether any thumbnail image is selected is determined. For example, the user operates the enter button 36 to select any of the thumbnail images. When the enter button 36 is operated, a single image at which the cursor 303 is positioned at that time is displayed. Single-image display means that only one image is displayed in the display area of the display unit 34.

Figure 15C:
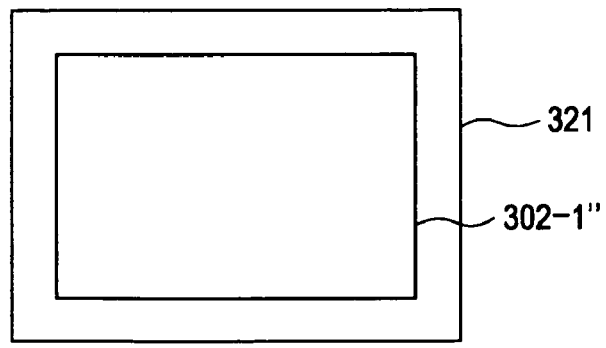

FIG. 15C shows an example of single-image display. In this example, only one image 302-1" is displayed in a single-image display screen 321. Referring to FIG. 15C, the image 302-1" alone is displayed because the enter button 36 is operated when the cursor 303 is positioned at the thumbnail image 302-1 displayed in the thumbnail list screen 301 in FIG. 15A or the thumbnail image 302-1' displayed in the thumbnail list screen 311 in FIG. 15B.

As described above, when it is determined in step S84 that the enter button 36 is operated, a single image corresponding to the thumbnail image pointed by the cursor 303 is displayed in step S85. After only one image is displayed in the display unit 34 as described above, the display screen may be returned to the previous state shown in FIG. 15A or 15B and a new image may be selected. In step S86, therefore, it is determined whether display of the previous thumbnail list screen is instructed. The previous thumbnail list screen is the thumbnail list screen 301 or 311.

When it is determined in step S86 that display of the previous thumbnail list screen is instructed, the process is returned to step S83. Step S83 and subsequent steps are repeated. On the other hand, if it is determined in step S86 that display of the previous thumbnail list screen is not instructed, the process proceeds to step S87.

The process also proceeds to step S87 when it is determined in step S84 that any image is not selected. In step S87, it is determined whether playback of any of images recorded in the area 181 in the internal recording unit 59 is instructed. If NO in step S87, the process proceeds to step S88.

Figure 16A:
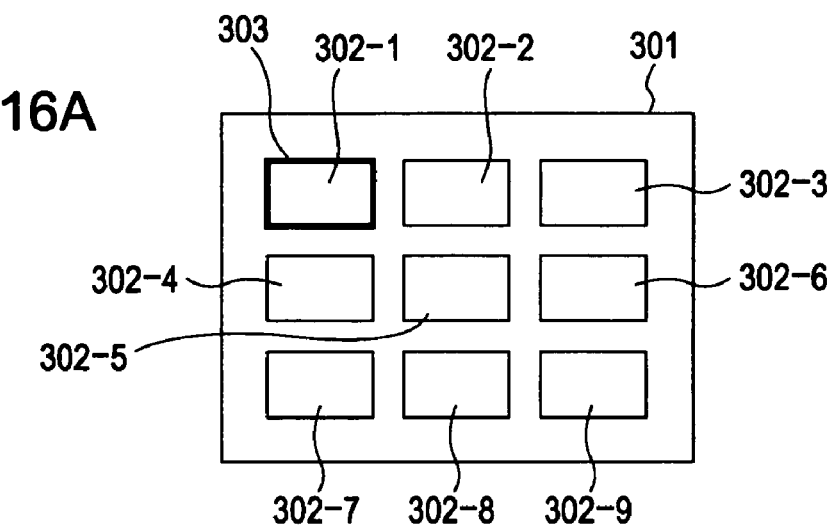
FIGS. 16A and 16B are diagrams showing examples of displayed screens.
Figure 16B:
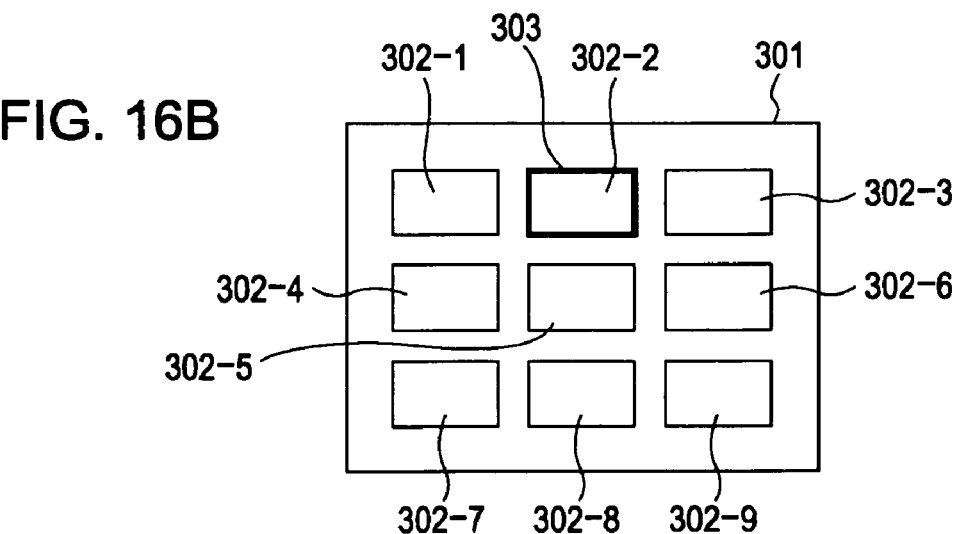

In step S88, the cursor 303 is moved. When the process proceeds to step S88, the screen of the display unit 34 is in the state shown in FIG. 15A, 15B, or 15C. When the screen of FIG. 15A or 15B, i.e., the thumbnail list screen 301 or 311 including a plurality of thumbnail images is displayed, the cursor 303 is moved to a thumbnail image specified by the user. For example, assuming that the cursor 303 is positioned at the thumbnail image 302-1 of the thumbnail list screen 301 as shown in FIG. 16A, when step S88 is executed, the cursor 303 is moved to the thumbnail image 302-2 as shown in FIG. 16B.

When the screen of FIG. 15C, i.e., the single-image display screen is displayed, the displayed image is changed to the preceding or following image in terms of time, e.g., the adjacent image specified by the user (e.g., the thumbnail image 302-2) in the thumbnail list screen 301. This change corresponds to the movement of the cursor 303.

After step S88 is terminated, the process proceeds to step S82. Step S82 and subsequent steps are repeated.

On the other hand, if it is determined in step S87 that playback of any of images recorded in the area 181 of the internal recording unit 59 (hereinafter, simply referred to images recorded on the internal recording unit 59), the process proceeds to step S89 (FIG. 14).

In step S89, a thumbnail list screen related to images recorded o the internal recording unit 59 is displayed in the display unit 34. Steps S89 to S96 are related to playback of any of the images recorded on the internal recording unit 59. The internal-playback control section 161 (FIG. 3) executes these steps.

In this instance, a thumbnail list screen related to the images recorded on the internal recording unit 59 and a change in screen from the thumbnail list screen to a single-image display screen will now be described with reference to FIGS. 17A to 17C.

Figure 17A:
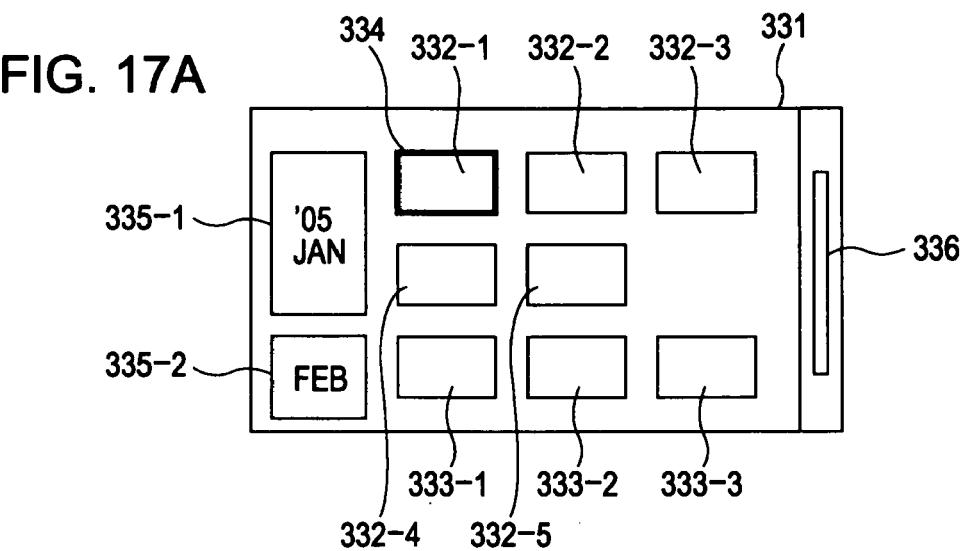
FIGS. 17A to 17C are diagrams showing examples of displayed screens.

FIG. 17A shows an example of a thumbnail list screen related to the images recorded on the internal recording unit 59. Referring to FIG. 17A, a thumbnail list screen 331 related to the images recorded on the internal recording unit 59 is different from the thumbnail list screen 311 (FIG. 15A) related to the images recorded on the removable medium 91.

Specifically, in addition to thumbnail images 332-1 to 332-5 and thumbnail images 333-1 to 333-3, the thumbnail list screen 331 shown in FIG. 17A includes date fields 335-1 and 335-2 in the left part thereof. Each date field indicates a date. A cursor 334 for selection of any thumbnail image is also displayed in the thumbnail list screen 331. The thumbnail list screen 331 further includes a scroll bar 336 in the right part thereof. The user operates the scroll bar 336 to display undisplayed thumbnail images.

Upon display of the thumbnail list screen related to the images recorded on the internal recording unit 59, thumbnail images are displayed such that they are sorted by date. The internal recording unit 59 manages image files arranged in the data structure shown in FIG. 10 and the property file 203. As described above, the property file 203 manages image files sorted by shooting date. The user can view a list of thumbnail images ordered by date by referring to the property file 203.

Referring to FIG. 17A, the thumbnail images 332-1 to 332-5 belong to "'05 JAN" and the thumbnail images 333-1 to 333-3 belong to "FEB". In other words, in this case, the thumbnail images 332-1 to 332-5 were captured in "'05 JAN" that means January 2005. The thumbnail images 333-1 to 333-3 were captured in "FEB (although omitted here, '05 FEB)" that means February 2005.

In this thumbnail list screen 331, each displayed thumbnail image corresponds to any one of images captured on the same date. As described above, the thumbnail list screen 331 includes thumbnail images sorted by month. When any one thumbnail image is selected from the thumbnail list screen 331, the screen displayed in the display unit 34 is changed to another thumbnail list screen 351 as shown in FIG. 17B.

The thumbnail list screen 351 displays a list of thumbnail images corresponding to images captured on the same date as that when the selected thumbnail image was captured. For example, assuming that the cursor 334 is positioned at the thumbnail image 332-1 in the thumbnail list screen 331 shown in FIG. 17A, when the enter button 36 (FIG. 1) is operated, a list of thumbnail images is displayed as the thumbnail list screen 351. The displayed thumbnail images include an image corresponding to the selected thumbnail image 332-1 and also correspond to images captured on the same date as the shooting date of the selected thumbnail image 332-1.

In other words, the thumbnail list screen 331 in FIG. 17A includes thumbnail images sorted by month. Each sorted thumbnail image is a typical one of images captured on a predetermined day in the corresponding month. When such a sorted thumbnail image is selected, a list of thumbnail images corresponding to images captured on the predetermined day is displayed as shown in FIG. 17B.

Figure 17B:
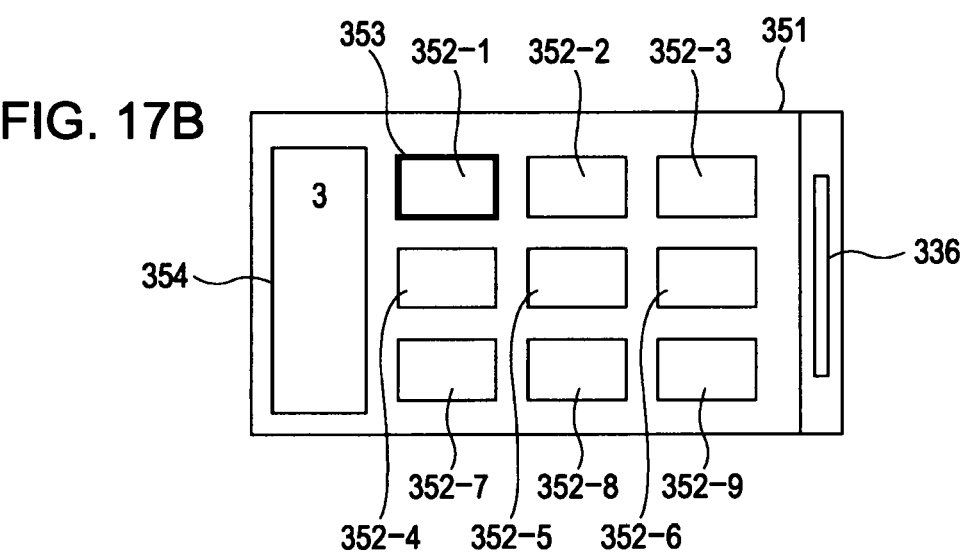
Figure 17C:
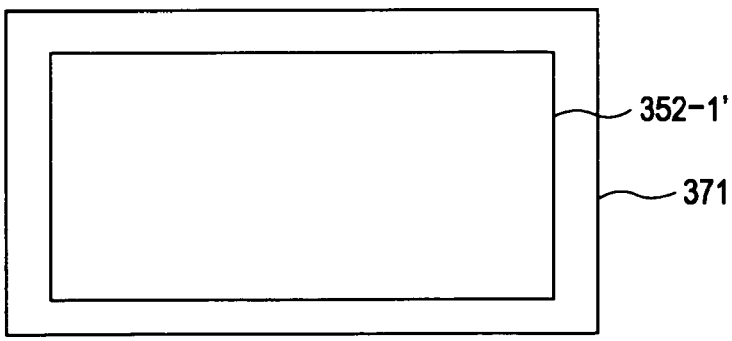

Referring to FIG. 17B, the thumbnail list screen 351 includes thumbnail images 352-1 to 352-9. A cursor 353 is displayed at the thumbnail image 352-1. The thumbnail list screen 351 further includes a date field 354 indicating a date in the left part thereof and also includes the scroll bar 336 in the right part thereof.

When a predetermined thumbnail image is selected from the thumbnail list screen 351, one image corresponding to the selected thumbnail image is displayed. For example, assuming that the cursor 353 is positioned at the thumbnail image 352-1 in the thumbnail list screen 351 in FIG. 17B, when the enter button 36 is operated, an image 352-1' corresponding to the thumbnail image 352-1 is displayed as a single-image display screen 371 in the display unit 34.

Images can be sequentially selected in the above-described manner.

Again referring to the flowchart in FIG. 14, the thumbnail list screen 331 related to the images recorded on the internal recording unit 59 is displayed in step S89, and after that, it is determined in step S90 whether any date is selected. The fact that a date is selected means that one thumbnail image is selected from thumbnail images displayed in the thumbnail list screen 351.

If it is determined in step S90 that a date is selected (i.e., one thumbnail image is selected), the process proceeds to step S91. In step S91, a thumbnail list screen related to the selected date, i.e., a thumbnail list screen related to images captured on the same date as that when the selected thumbnail image was captured is displayed in step S91. As described above, the screen as shown in FIG. 17B is displayed.

After the thumbnail list screen related to the selected date is displayed, it is determined in step S92 whether display of the preceding thumbnail list screen is instructed. In other words, it is determined whether the user instructs to return the screen shown in FIG. 17B to that shown in FIG. 17A. If YES in step S92, the process is returned to step S89, and after that, step S89 and subsequent steps are repeated.

On the other hand, if it is determined in step S92 that an instruction to return to the preceding thumbnail list screen is not generated, the process proceeds to step S93. In step S93, whether any thumbnail image is selected, i.e., whether the enter button 36 is operated is determined. If YES in step S93, the process proceeds to step S94. The selected image is played. In other words, as described above, a single image is displayed as shown in FIG. 17C.

After the single image is displayed, it is determined in step S95 whether display of the preceding thumbnail list screen related to the date is instructed. In other words, it is determined whether an instruction to return the screen shown in FIG. 17C to that shown in FIG. 17B is given. If YES in step S95, the process is returned to step S91. Step S91 and subsequent steps are repeated.

On the other hand, when it is determined in step S95 that display of the previous thumbnail list screen related to the date is not instructed, the process proceeds to step S96. In step S96, whether playback of any image recorded in the removable medium 91 is instructed is determined. If YES in step S96, the process is returned to step S81 (FIG. 13). Step S81 and subsequent steps are repeated.

On the other hand, if it is determined in step S96 that playback of the images recorded in the removable medium 91 is not instructed, the process is returned to step S97. When it is determined in step S90 that any thumbnail image is not selected from the thumbnail list screen 331 in FIG. 17A, the process also proceeds to step S97.

In step S97, the cursor is moved. In other words, step S97 is fundamentally the same as step S88. When the thumbnail list screen 331 or 351 is displayed as shown in FIG. 17A or 17B, the cursor 334 is moved in the direction specified by the user. When the single-image display screen is displayed as shown in FIG. 17C, the displayed image is changed to the adjacent image in terms of, e.g., time.

The playback process is executed as described above. When the user instructs to terminate playback, the playback process is terminated in accordance with the instruction, serving as an interruption process.

During playback, screens related to the images recorded in the internal recording unit 59 are different from those related to the images recorded in the removable medium 91. In particular, when an image recorded in the internal recording unit 59 is displayed (played), the image previously captured through the image processing apparatus 11 is displayed such that the user can know the shooting date of the displayed image. Therefore, the images recorded in the internal recording unit 59 can be used as an image album.

The images recorded in the internal recording unit 59 cannot be viewed through an external device while the device is connected to the image processing apparatus 11 via USB. However, when a television receiver is connected to the image processing apparatus 11 via an AV cable, the image recorded in the internal recording unit 59 may be viewed through the television receiver. Therefore, the user can view the images recorded in the internal recording unit 59 as an image album through the television receiver. Fundamentally, images can be played through the television receiver in a manner similar to the process described with reference to the flowchart shown in FIGS. 13 and 14. A display of the television receiver may be used instead of the display unit 34.

In the above-described embodiment, image data (image files) recorded in the area 181 in the internal recording unit 59 is unviewable through an external device connected to the present apparatus. The present apparatus may include a function of copying image data recorded in the internal recording unit 59 so that the user can show or give an image captured by the user to another user. Accordingly, even when images recorded in the removable medium 91 are deleted by accident, the deleted data can be restored using data recorded in the internal recording unit 59. In other words, data recorded in the internal recording unit 59 may be used for backup.

Recording Media

The above-described series of steps may be executed by hardware or software. When the steps is implemented by software, a program constituting the software is installed through a program storage medium into a computer incorporated in dedicated hardware or into a multi-purpose personal computer capable of executing various functions by installing various programs.

Program storage media, each of which stores the program to be installed into a computer and be executable through the computer, include the removable medium 91, serving as a package medium such as a magnetic disk (e.g., a flexible disk), an optical disk (e.g., a compact disc-read only memory (CD-ROM) or a digital versatile disc (DVD)), a magneto-optical disc (e.g., a MiniDisc (MD)), or a semiconductor memory, the ROM 63 in which the program is temporarily or permanently stored, and a hard disk constituting the internal recording unit 59. A program is stored into a program storage medium through a communication unit (not shown), serving as an interface such as a router or a modem, using a wired or wireless communication medium, such as a local area network, the Internet, or digital satellite broadcasting, as necessary.

In this specification, steps describing the program stored in a program storage medium may be executed in time-series in the above-described order, or may be performed in parallel or individually.

It should be understood by those skilled in the art that various modifications, combinations, sub-combinations and alterations may occur depending on design requirements and other factors insofar as they are within the scope of the appended claims or the equivalents thereof.

The invention claimed is:

1. An information processing apparatus having a plurality of recording media, the apparatus comprising:
    imaging means for capturing an image of a subject;
    recording means for recording image data of the captured image onto the recording media, such that the amounts of recorded image data differ between at least a first recording medium and a second recording medium of the recording media, wherein the image data recorded on the first recording medium is not modifiable by an external device capable of modifying image data; and
    determining means for determining whether an external device capable of modifying image data is connected to the information processing apparatus, wherein, when an external device capable of modifying image data is determined to be connected to the information processing apparatus, the image data recorded on the first recording medium is not viewable through the external device and the information processing apparatus and, when an external device not capable of modifying image data is determined to be connected to the information processing apparatus, the image data recorded on the first recording medium is viewable through the external device and the information processing apparatus.

2. The apparatus according to claim 1, wherein
    the first recording medium is built in the information processing apparatus and
    the second recording medium is removable from the information processing apparatus, and the recording means records the image data such that the amount of image data recorded on the first recording medium is smaller than the amount of image data recorded on the second recording medium.

3. The apparatus according to claim 2, wherein when a remaining available capacity of the first recording medium is insufficient to record new image data, the image data recorded on the first recording medium is deleted in capturing order.

4. The apparatus according to claim 1, wherein
    the first recording medium is built in the information processing apparatus and the second recording medium is removable from the information processing apparatus, and
    the recording means records the image data such that the compression ratio of the image data recorded on the first recording medium is higher than the compression ratio of the image data recorded on the second recording medium.

5. The apparatus according to claim 1, wherein
    the first recording medium is provided in the information processing apparatus and the second recording medium is removable from the information processing apparatus, and
    the recording means further records a management file for management of the image data onto the first recording medium.

6. The apparatus according to claim 5, wherein the image data is sorted by date and is managed in the management file.

7. The apparatus according to claim 1, further comprising:
    playback means for playing the image data recorded on the plurality of recording media; and
    selection means for selecting any one of the recording media, wherein the playback means plays the image data recorded on the selected recording medium.

8. The apparatus according to claim 7, wherein
    the first recording medium is built in the information processing apparatus and the second recording medium is removable from the information processing apparatus,
    the recording means further records a management file for management of the image data onto the first recording medium, and
    the playback means plays the image data recorded on the first recording medium based on the management file and plays the image data recorded on the second recording medium in capturing order.

9. A method for processing information in an information processing apparatus having a plurality of recording media, the method comprising:
    capturing an image of a subject;
    recording image data of the captured image onto the recording media, such that the amounts of recorded image data differ between at least a first recording medium and a second recording medium of the recording media, wherein the image data recorded on the first recording medium is not modifiable by an external device capable of modifying image data; and
    determining whether an external device capable of modifying image data is connected to the information processing apparatus, wherein, when an external device capable of modifying image data is determined to be connected to the information processing apparatus, the image data recorded on the first recording medium is not viewable through the external device and the information processing apparatus and, when an external device not capable of modifying image data determined to be connected to the information processing apparatus, the image data recorded on the first recording medium is viewable through the external device and the information processing apparatus.

10. A non-transitory storage medium recorded with a program readable by a computer for allowing the computer to execute a process by an information processing apparatus having a plurality of recording media, the process comprising:
    capturing an image of a subject;
    recording image data of the captured image onto the recording media, such that the amounts of recorded image data differ between at least a first recording medium and a second recording medium of the recording media, wherein the image data recorded on the first recording medium is not modifiable by an external device capable of modifying image data; and
    determining whether an external device capable of modifying image data is connected to the information processing apparatus, wherein, when an external device capable of modifying image data is determined to be connected to the information processing apparatus, the image data recorded on the first recording medium is not viewable through the external device and the information processing apparatus, and, when an external device not capable of modifying image data determined to be connected to the information processing apparatus, the image data recorded on the first recording medium viewable through the external device and the information processing apparatus.

11. An information processing apparatus having a plurality of recording media, the apparatus comprising:

an imaging unit operable to capture an image of a subject;

a recording unit operable to record image data of the captured image onto the recording media, such that the amounts of recorded image data differ between at least a first recording medium and a second recording medium of the recording media, wherein the image data recorded on the first recording medium is not modifiable by an external device capable of modifying image data; and a determining unit operable to determine whether an external device capable of modifying image data is connected to the information processing apparatus, wherein, when an external device capable of modifying image data is determined to be connected to the information processing apparatus, the image data recorded on the first recording medium is not viewable through the external device and the information processing apparatus, and, when an external device not capable of modifying image data is determined to be connected to the information processing apparatus, the image data recorded on the first recording medium is viewable through the external device and the information processing apparatus.

* * * * *